United States Patent
Komiya

(10) Patent No.: US 9,079,620 B2
(45) Date of Patent: Jul. 14, 2015

(54) MOUNTING STRUCTURE FOR REAR SUB-FRAME

(71) Applicant: MAZDA MOTOR CORPORATION, Hiroshima (JP)

(72) Inventor: Katsuyuki Komiya, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/378,952

(22) PCT Filed: Feb. 14, 2013

(86) PCT No.: PCT/JP2013/000806
§ 371 (c)(1),
(2) Date: Aug. 14, 2014

(87) PCT Pub. No.: WO2013/121783
PCT Pub. Date: Aug. 22, 2013

(65) Prior Publication Data
US 2014/0368000 A1    Dec. 18, 2014

(30) Foreign Application Priority Data
Feb. 17, 2012  (JP) ................... 2012-032910

(51) Int. Cl.
*B62D 21/11*    (2006.01)
(52) U.S. Cl.
CPC ..................... *B62D 21/11* (2013.01)
(58) Field of Classification Search
CPC ....................................................... B62D 21/11
See application file for complete search history.

(56) References Cited

U.S. PATENT DOCUMENTS

| 5,560,651 | A | 10/1996 | Kami et al. |
| 5,562,308 | A * | 10/1996 | Kamei et al. ................... 280/788 |
| 6,120,060 | A * | 9/2000 | Kocer et al. .................... 280/788 |
| 6,511,096 | B1 * | 1/2003 | Kunert et al. .................. 280/785 |
| 6,869,090 | B2 * | 3/2005 | Tatsumi et al. ......... 280/124.109 |
| 7,097,185 | B2 * | 8/2006 | Kato et al. .............. 280/124.109 |
| 8,025,313 | B2 * | 9/2011 | Tanaka et al. .................. 280/781 |

(Continued)

FOREIGN PATENT DOCUMENTS

| DE | 102006058993 A1 * | 6/2008 | ............ B62D 21/11 |
| JP | 06-286642 A | 10/1994 | |

(Continued)

OTHER PUBLICATIONS

International Search Report; PCT/JP2013/000806; May 14, 2013.

*Primary Examiner* — Nicole Verley
(74) *Attorney, Agent, or Firm* — Studebaker & Brackett PC

(57) ABSTRACT

A rear subframe comprises: a pair of right and left side member segments; and a front cross member segment and a rear cross member segment each coupling the side member segments together. The rear cross member segment has: a central portion; and a front branch portion and a rear branch portion branched forwardly and rearwardly from each of vehicle-widthwise outer ends of the central portion, while extending in the vehicle width direction. Each of the side member segments has a bent portion with its axis extending in a curved manner between a coupling portion between the front branch portion and the side member segments, and a coupling portion between the rear branch portion and the side member segments. The bent portion has a wall thickness set to be less than that of a region of the side member segment located forward of the bent portion.

5 Claims, 19 Drawing Sheets

(56) References Cited

U.S. PATENT DOCUMENTS

| | | | |
|---|---|---|---|
| 8,511,696 B2 * | 8/2013 | Tanaka et al. | 280/124.109 |
| 8,616,567 B2 * | 12/2013 | Eguchi et al. | 280/124.107 |
| 8,641,066 B2 * | 2/2014 | Kudla et al. | 280/124.109 |
| 8,684,382 B2 * | 4/2014 | Buschjohann et al. | 280/124.109 |
| 8,857,836 B2 * | 10/2014 | Okuyama et al. | 280/124.109 |
| 8,915,326 B2 * | 12/2014 | Leibl | 180/299 |
| 2004/0080188 A1 * | 4/2004 | Igarashi et al. | 296/203.04 |
| 2009/0243272 A1 * | 10/2009 | Tanaka et al. | 280/794 |
| 2013/0009375 A1 | 1/2013 | Tanaka et al. | |
| 2014/0117654 A1 * | 5/2014 | Buschjohann et al. | 280/795 |
| 2014/0319880 A1 * | 10/2014 | Shigihara | 296/193.09 |
| 2014/0368000 A1 * | 12/2014 | Komiya | 296/193.07 |

FOREIGN PATENT DOCUMENTS

| | | |
|---|---|---|
| JP | 08-080866 A | 3/1996 |
| JP | 2003-182625 A | 7/2003 |
| JP | 2011-207351 A | 10/2011 |
| WO | WO 2009015722 A2 * | 2/2009 |

* cited by examiner

FIG. 8

MOUNTING STRUCTURE FOR REAR SUB-FRAME

TECHNICAL FIELD

The present invention relates to a mounting structure for mounting to a vehicle body a rear subframe supporting an arm of a rear suspension.

BACKGROUND ART

Heretofore, as a rear subframe supporting an arm of a rear suspension, there has been known one type which comprises a pair of right and left side member segments each extending in a vehicle front-rear direction and a cross member segment disposed between the pair of right and left side member segments (see the following Patent Literatures 1 and 2).

Specifically, a rear subframe described in the Patent Literature 1 comprises a pair of right and left side member segments (longitudinal members) each having a central portion in the vehicle front-rear direction which is largely curved in such a manner as to protrude inwardly in a vehicle width direction, and two cross member segments (lateral members) each disposed between the pair of right and left longitudinal members.

A rear subframe described in the Patent Literature 2 comprises a pair of right and left side member segments (side members) each having a rear portion in the vehicle front-rear direction which is bent in such a manner as to be located outwardly in a vehicle width direction with respect to a front portion thereof, and two cross member segments (cross members) each disposed between the pair of right and left longitudinal members.

Meanwhile, in addition to weight reduction and downsizing, a rear subframe is required to be enhanced in its own rigidity and in rigidity of a vehicle body-mountable section thereof, in order to enhance suspension arm supporting rigidity in normal state (particularly, rigidity against a load input in the vehicle width direction during vehicle turning). However, on the other hand, in the event of a rear collision, there is a contradictory need for allowing a portion of the rear subframe to be easily deformed, in order to absorb a rear impact load.

In the Patent Literature 1, each of the side member segments is curved, so that it becomes possible to, during a rear collision, cause a rear portion of the side member segment to be bendingly deformed outwardly in the vehicle width direction, and absorb an impact load by means of the bending deformation of the side member segment.

However, because the side member segment is largely curved over its overall front-rear length, a distance between a mountable section as a vehicle body-mountable section, and an arm support section is undesirably increased. This leads to an increase in weight, and means that it is unable to enhance the suspension arm supporting rigidity. Thus, as for the conventional structure disclosed in the Patent Literature 1, there remains a need for further improvement in terms of weight reduction, rigidity enhancement, and downsizing.

In the Patent Literature 2, the rear portion of each of the side member segments is bent outwardly in the vehicle width direction, so that it becomes possible to, during a rear collision, cause the rear portion of the side member segment to be bendingly deformed outwardly in the vehicle width direction, and absorb an impact load by means of the bending deformation of the side member segment.

However, because the bent portion of the side member segment is located rearward of a rear one of the cross members, a distance between a vehicle body-mountable section at a rear end of the side member segment and a suspension arm support section of the side member segment is undesirably increased. This leads to an increase in weight, and means that it is unable to enhance the suspension arm supporting rigidity. Thus, as for the conventional structure disclosed in the Patent Literature 2, there remains a need for further improvement in terms of weight reduction, rigidity enhancement, and downsizing.

CITATION LIST

Patent Literature

Patent Literature 1: JP 2011-207351A
Patent Literature 2: JP 08-80866A

SUMMARY OF INVENTION

Therefore, it is an object of the present invention to provide a rear subframe mounting structure capable of supporting a suspension arm with high rigidity even in a compact structure, and sufficiently absorbing a rear impact load.

The present invention relates to a mounting structure for mounting to a vehicle body a rear subframe supporting an arm of a rear suspension, as a technique for achieving the above object. The rear subframe comprises: a pair of right and left side member segments; a front cross member segment coupling the side member segments together; and a rear cross member segment coupling the side member segments together, at a position spaced apart rearwardly from the front cross member segment. The rear cross member segment has a central portion extending in a vehicle width direction between the side member segments, and a front branch portion and a rear branch portion branched forwardly and rearwardly from each of vehicle-widthwise outer ends of the central portion, while extending in the vehicle width direction. Each of the side member segments has a bent portion with its axis extending in a curved manner between a coupling portion between the front branch portion and the side member segment, and a coupling portion between the rear branch portion and the side member segment. The bent portion has a wall thickness set to be less than that of a region of the side member segment located forward of the bent portion.

The present invention makes it possible for the rear subframe to achieve downsizing, weight reduction and rigidity enhancement, and support suspension arm with enhanced supporting rigidity. The present invention also makes it possible for the rear subframe to be relatively easily deformed during a vehicle rear collision, to thereby sufficiently absorb an impact load due to the rear collision.

BRIEF DESCRIPTION OF DRAWINGS

FIG. 8 is a back view of the rear subframe.

DESCRIPTION OF EMBODIMENTS

Based on the drawings, a first embodiment of the present invention will be described in detail.

Figure 1:
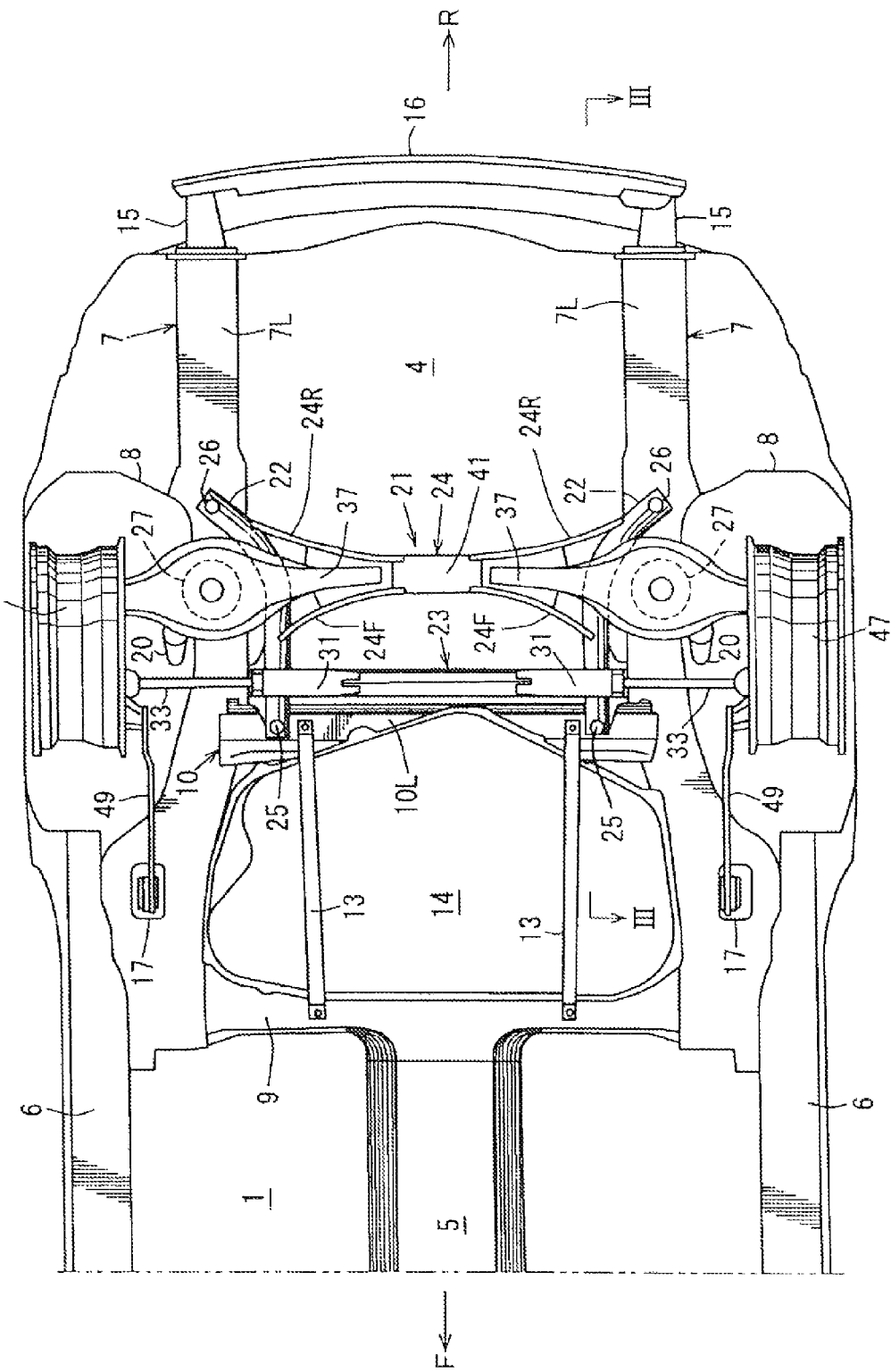
FIG. 1 is a bottom view illustrating a rear subframe mounting structure of the present invention.
Figure 2:
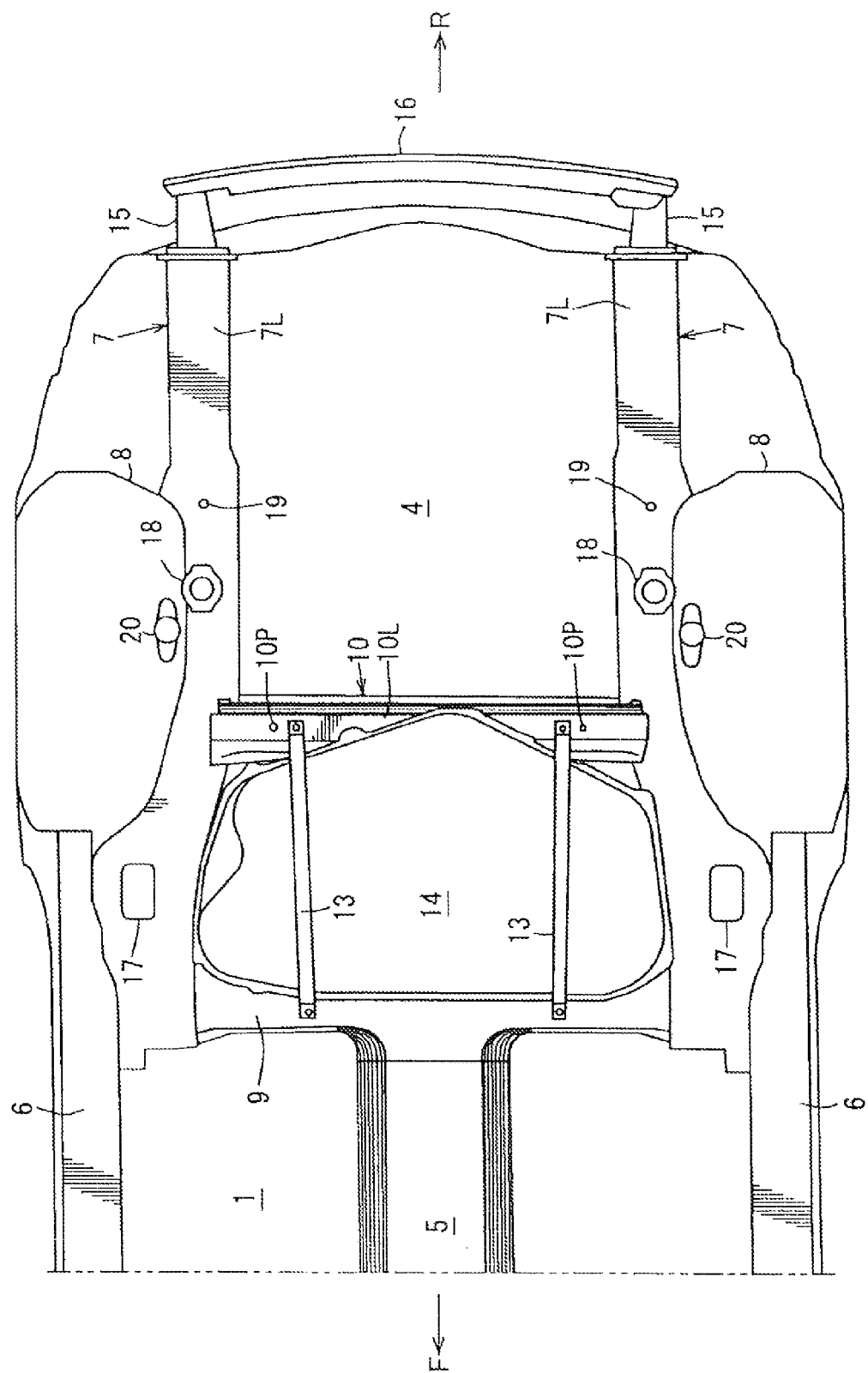
FIG. 2 is a bottom view of a state in which a rear subframe and a suspension arm are removed from FIG. 1.
Figure 3:
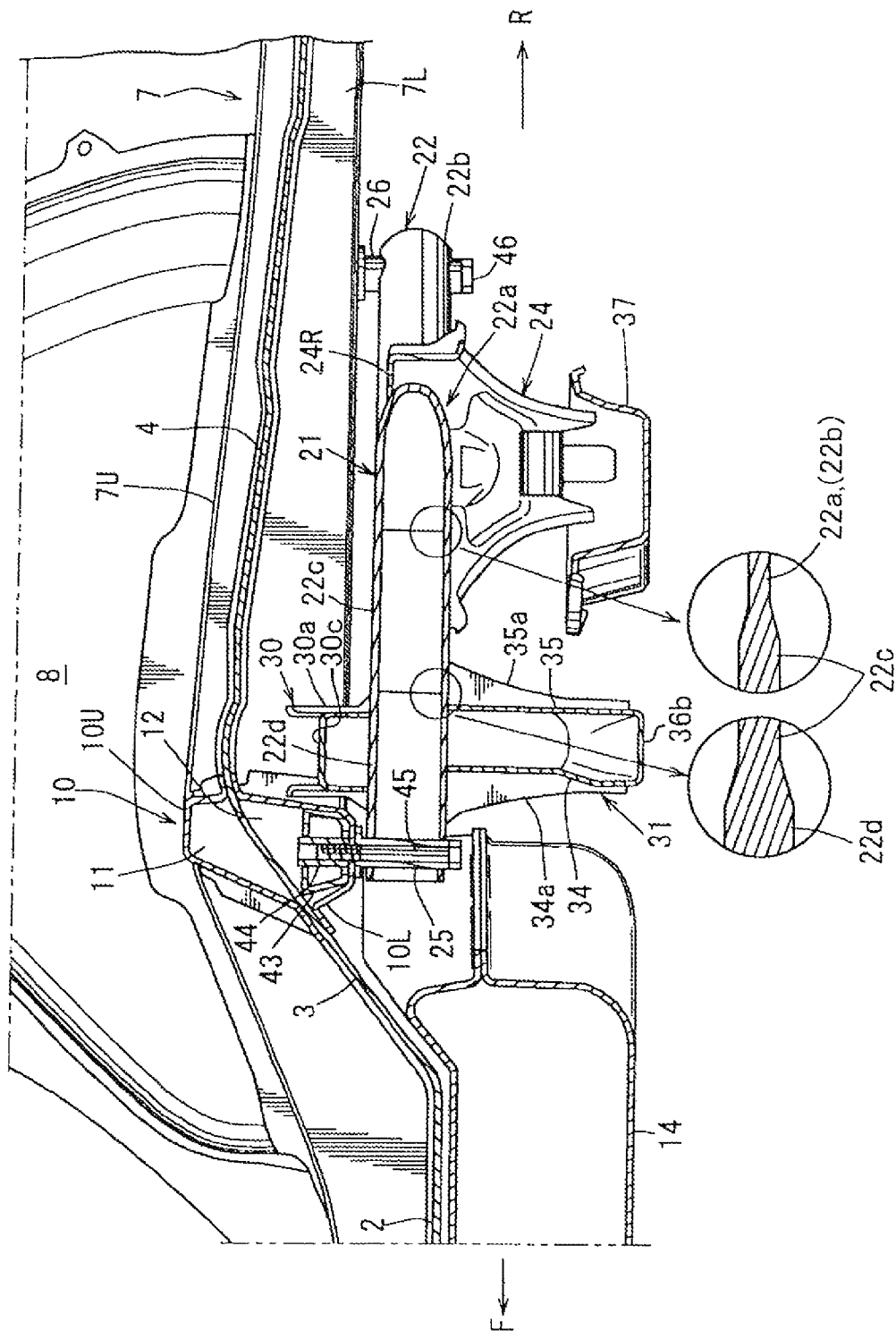
FIG. 3 is a sectional view taken along the arrowed line III-III in FIG. 1.

FIG. 1 is a bottom view illustrating a rear subframe mounting structure, and FIG. 2 and FIG. 3 are, respectively, a bottom view of a state in which a rear subframe, a suspension arm, etc., are removed from FIG. 1, and a sectional view taken along the arrowed line III-III in FIG. 1, wherein the arrowed line F indicates a forward (vehicle front) direction, and the arrowed line R indicates a rearward (vehicle rear) direction.

<Description of Vehicle Body Structure>

As illustrated primarily in FIGS. 2 and 3, a rear seat pan 2 and a slant section 3 extending obliquely upwardly and rearwardly from a rear edge of the rear seat pan 2 are provided rearward of a center floor panel 1, and further a rear floor 4 is provided rearward of the slant section 3.

A tunnel section 5 is integrally formed with a vehicle widthwise central region of a set of the center floor panel 1 and a non-illustrated front floor panel to protrude toward an inside of a passenger compartment and extend in a vehicle front-rear direction, and a side sill 6 is joined and fixed to each of vehicle-widthwise outer edges of the set of the center floor panel 1 and the non-illustrated front floor panel.

A fuel tank 14 as a vehicle auxiliary component is disposed forward of an aftermentioned rear subframe 21 (more specifically, forward of an aftermentioned front cross member segment 23). The fuel tank 14 is mounted to a bottom (vehicle-exterior surface) of a set of the rear seat pan 2 and the slant section 3, using a pair of tank bands 13, 13.

The side sill 6 is a vehicle-body strength member having a side sill closed cross-section defined by joining a side sill inner panel and a side sill outer panel together to extend in the vehicle front-rear direction. According to need, a side sill reinforcement is provided within the side sill closed cross-section.

A pair of right and left rear side frames 7, 7 are provided to extend in the vehicle front-rear direction over a set of the rear seat pan 2, the slant section 3 and the rear floor 4.

The rear side frame 7 is provided on each of right and left sides of the vehicle, and located inward of a pair of right and left wheel houses 8, 8 in a vehicle width direction. The rear side frame 7 comprises a rear side frame upper panel 7U located on the side of an upper surface of the set of the rear seat pan 2, the slant section 3 and the rear floor 4, and a rear side frame lower panel 7L located on the side of a lower surface of the set of the rear seat pan 2, the slant section 3 and the rear floor 4. A rear side closed cross-section extending in the vehicle front-rear direction is defined between each of the rear side frame upper panel 7U and the rear side frame lower panel 7L, and the set of the components 2, 3, 4.

The rear side frame 7 is a strength member composed of a part of a skeleton of the vehicle body, and equivalent to "second vehicle-body component". A front end of the rear side frame 7 is coupled to the side sill 6 in a so-called "kick-up section" (a region where an aftermentioned No. 3 cross member 9 is disposed). A No. 3 cross member 9 is disposed to extend in the vehicle width direction between the front ends (coupling portions with the respective side sills 6) of the right and left rear side frames 7, 7, to define a closed cross-section extending in the vehicle width direction between the No. 3 cross member 9 and a vehicle-body floor panel (the rear seat pan 2).

A No. 4 cross member 10 extending in the vehicle width direction is provided rearward of the No. 3 cross member 9. The No. 4 cross member 10 is disposed to couple front-rear directional intermediate regions of the rear side frames 7, 7 corresponding to a rear end of the slant section 3.

The No. 4 cross member 10 comprises a cross member upper panel 10U located on the side of an upper surface of the slant section 3 to couple the right and left rear side frame upper panels 7U, 7U together in the vehicle width direction, and a cross member lower panel 10L located on the side of a lower surface of the slant section 3 to couple the right and left rear side frame lower panels 7L, 7L together in the vehicle width direction. A closed cross-section 11 extending in the vehicle width direction is defined between the cross member upper panel 10U and the slant section 3, and further a closed cross-section 12 extending in the vehicle width direction is defined between the cross member lower panel 10L and the slant section 3. That is, the upper and lower closed cross-sections 11, 12 are formed in such a manner as to overlap in an up-down direction, as illustrated in FIG. 3.

The No. 4 cross member 10 is a strength member composed of a part of a skeleton of the vehicle body, and equivalent to "first vehicle-body component". The cross member lower panel 10L of the No. 4 cross member 10 has a mounting point 10P set at a position inward of the rear side frame 7 in the vehicle width direction and configured for an aftermentioned front fixing section 25 of a side member segment 22 (see FIG. 1).

As illustrated in FIG. 2, right and left crush cans 15, 15 as an impact energy absorbing member are attached, respectively, to rear ends of the right and left rear side frames 7, 7, and a bumper reinforcement 16 extending in the vehicle width direction is disposed between the right and left crash cans 15, 15.

The rear side frame lower panel 7L has a front region provide with a trailing arm mounting portion 17 configured to allow an aftermentioned trailing arm 49 (FIG. 1) to be mounted thereto at a position between the front and rear cross members 9, 10, and an intermediate region in the front-rear direction provided with a spring seat 18 configured to allow an aftermentioned suspension spring 27 (FIG. 1) to be mounted thereto at a position rearward of the No. 4 cross member 10. The rear side frame lower panel 7L further has a mounting point 19 set at a position rearward of the spring seat 18 and configured for a rear fixing section 26 of the aftermentioned side member segment 22 (see FIG. 1). The wheel house 8 has a suspension damper mounting portion 20 provided thereinside.

<Description of Subframe>

As illustrated in FIG. 1 in the form of a bottom view, a rear subframe 21 for supporting a rear suspension is mounted to the vehicle body structure illustrated in FIGS. 2 and 3. Specifically, the rear subframe 21 is disposed to couple lower surfaces of the right and left rear side frames 7, 7 together.

Figure 4:
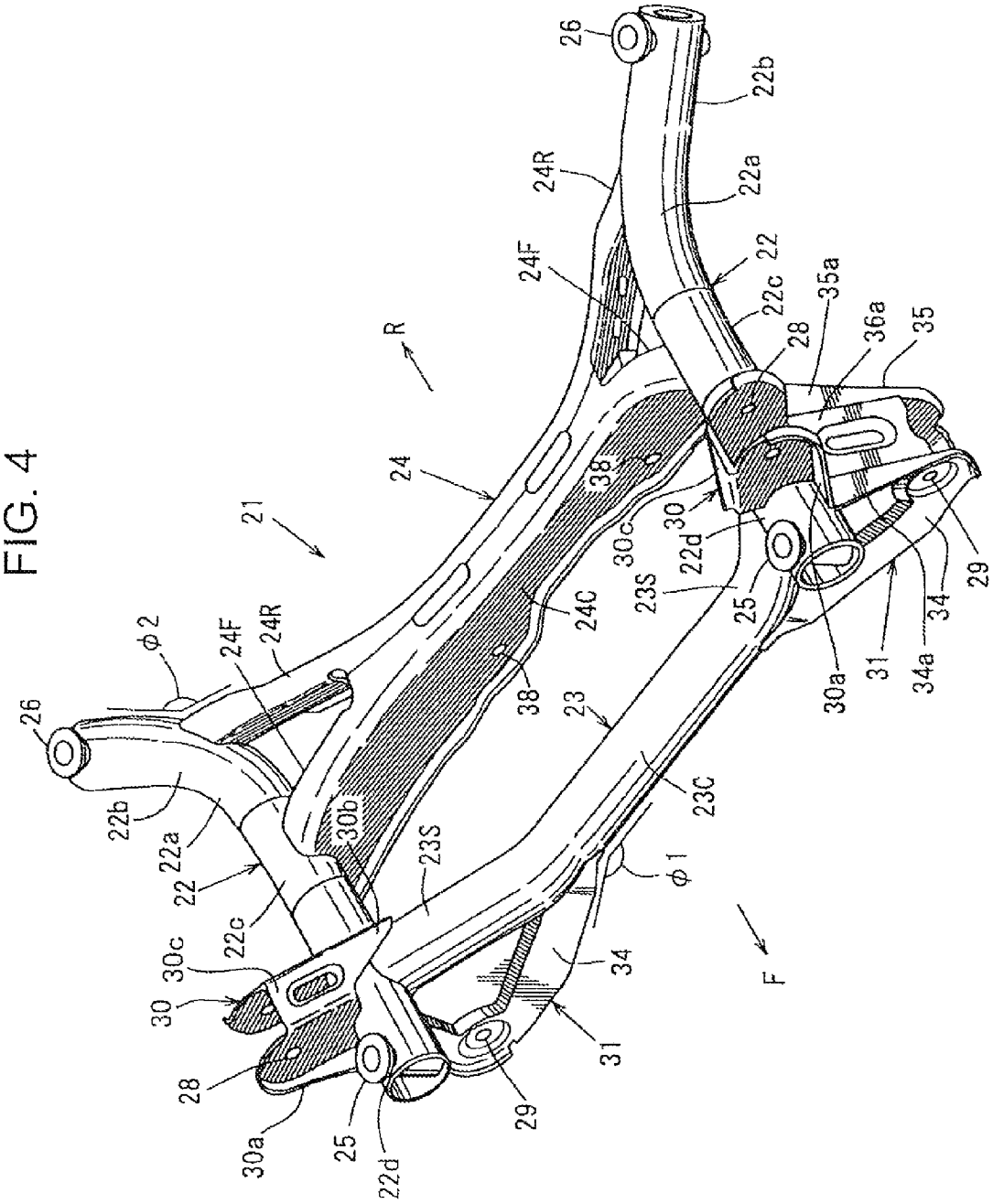
FIG. 4 is a perspective view of the rear subframe.
Figure 5:
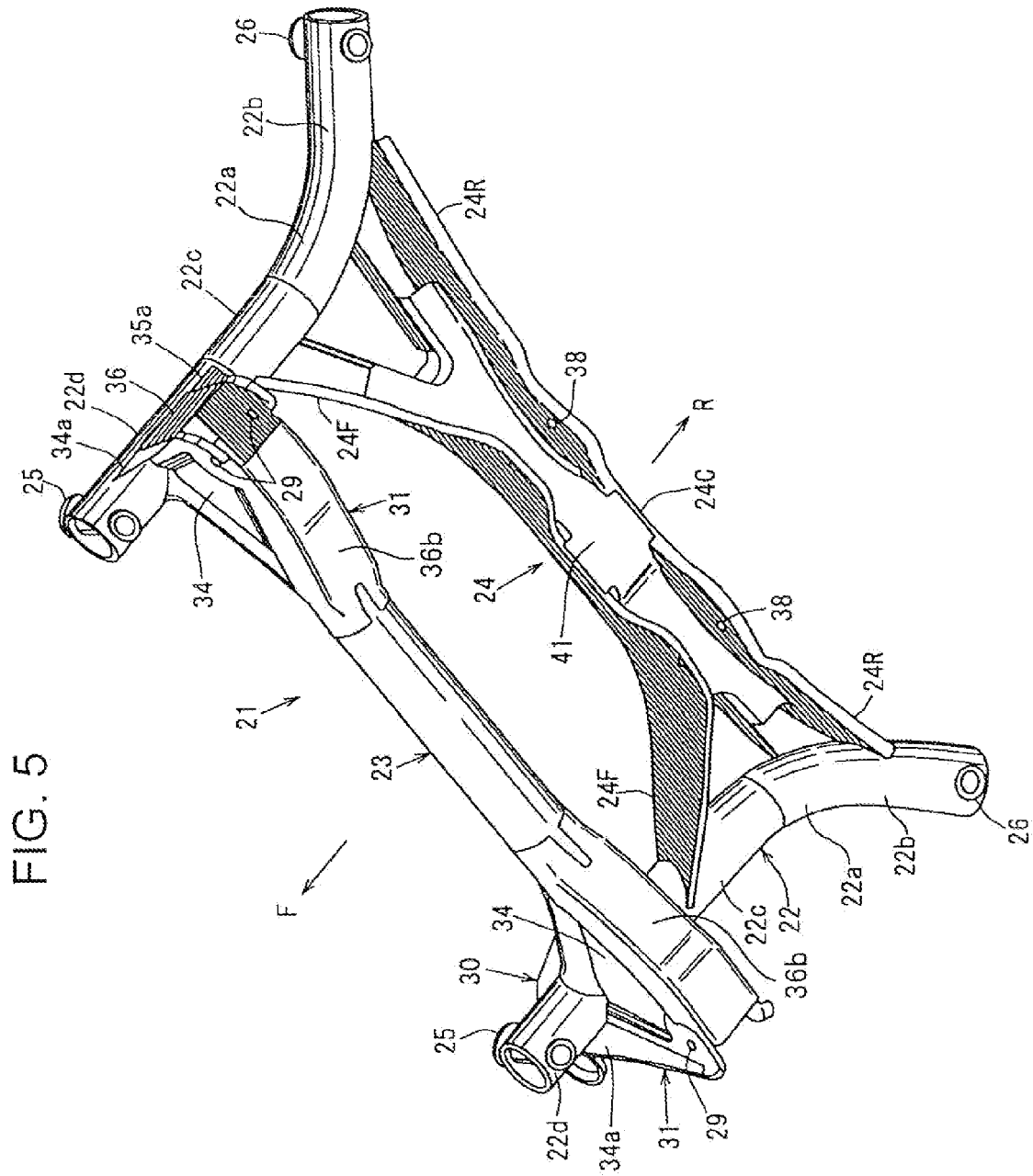
FIG. 5 is a perspective view of the rear subframe, when viewed obliquely upwardly from a lower side thereof.

FIG. 4 is a perspective view of the rear subframe 21, when viewed obliquely downwardly from an upper side thereof, and FIG. 5 is a perspective view of the rear subframe 21, when viewed obliquely upwardly from a lower side thereof. FIG. 6, FIG. 7, FIG. 8 and FIG. 9 are, respectively, a top plan view of the rear subframe 21, a front view of the rear subframe 21, a back view of the rear subframe 21, and a side view of the rear subframe 21.

Figure 6:
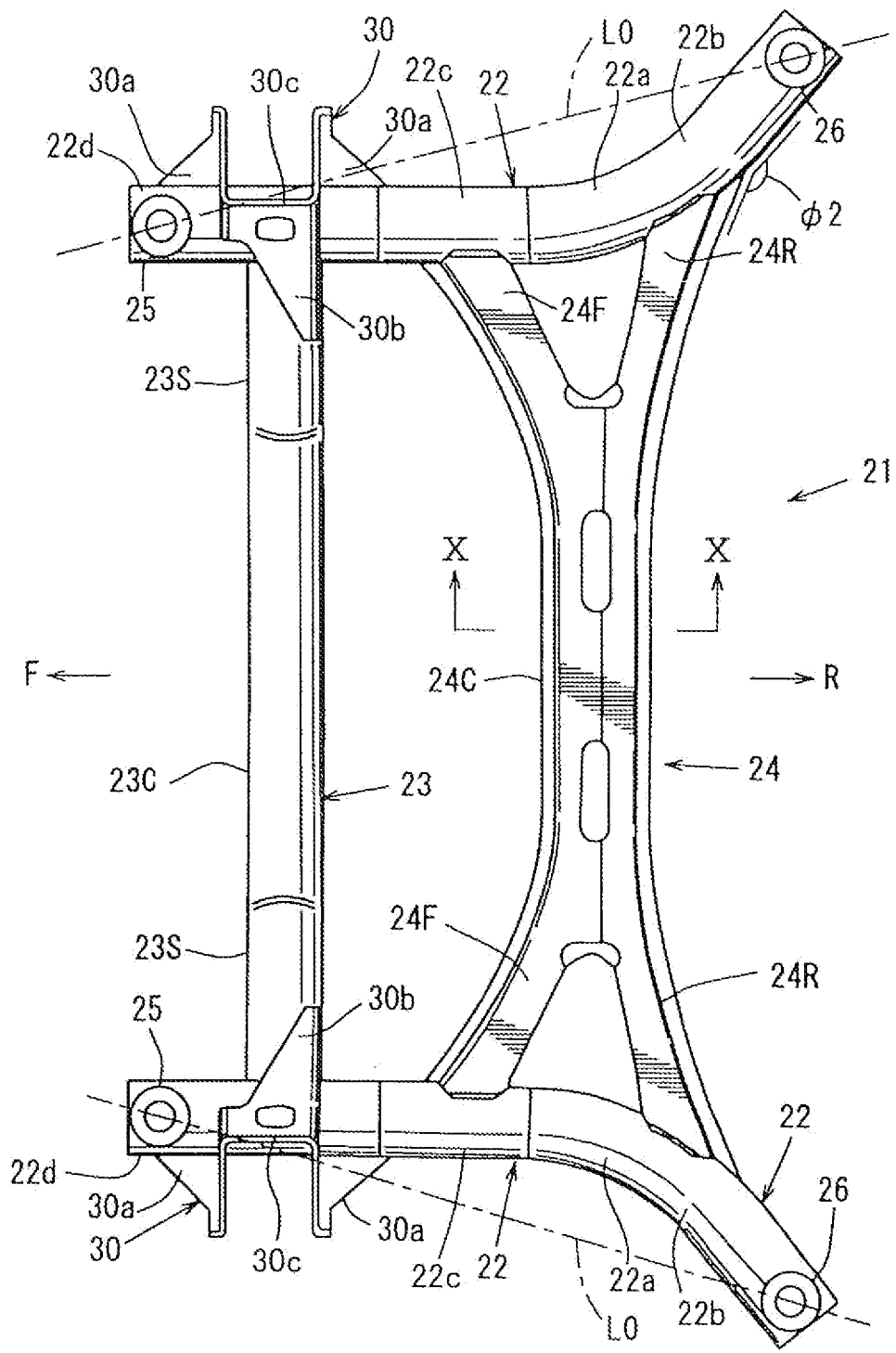
FIG. 6 is a top plan view of the rear subframe.

As illustrated in FIGS. 4 to 9, the rear subframe 21 comprises: a pair of right and left side member segments 22, 22; and a front cross member segment 23 and a rear cross member segment 24 each coupling the side member segments 22 together, wherein the rear subframe 21 is formed in a bilaterally approximately symmetrical configuration in top plan view (see FIG. 6).

Each of the right and left side member segments 22, 22 is composed of a pipe-like shaped member. The side member segment 22 has a front fixing section 25 (so-called "front mountable section") and a rear fixing section 26 (so-called "rear mountable section") each provided at a respective one of front and rear ends thereof. The front fixing section 25 and the rear fixing section 26 are arranged at the same height position, as illustrated in FIG. 3. Further, the front fixing section 25 is disposed inward of the rear fixing section 26 in the vehicle width direction.

Figure 7:
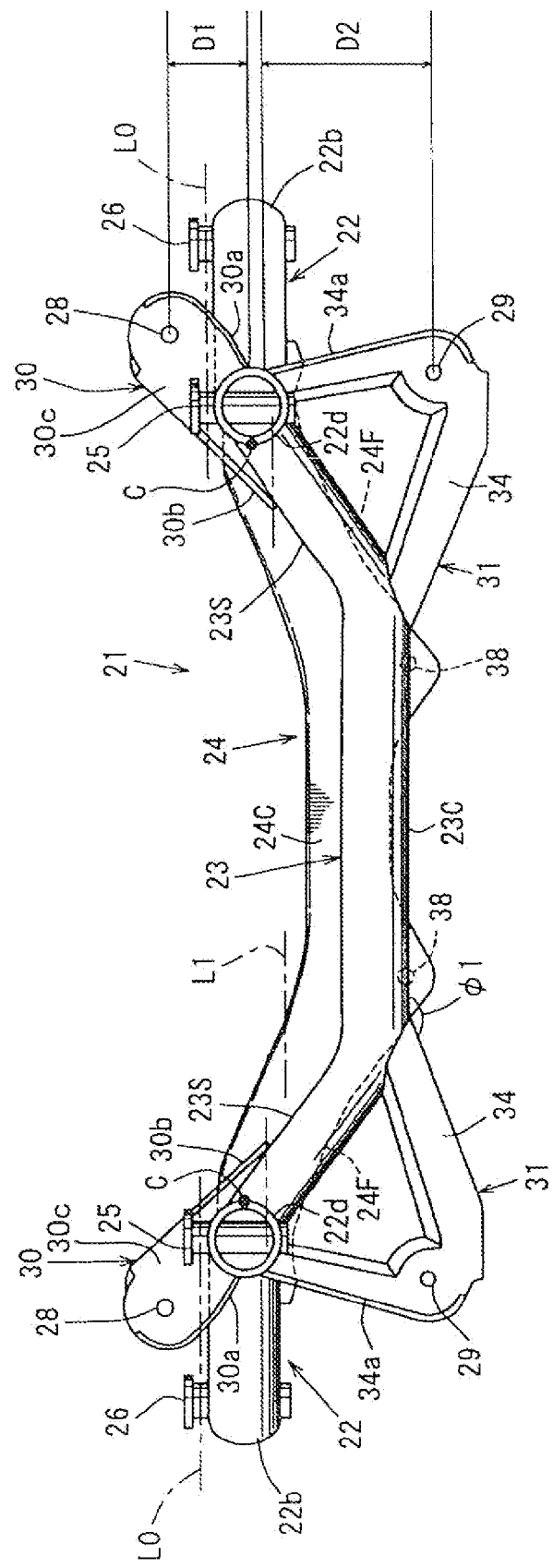
FIG. 7 is a front view of the rear subframe.
Figure 8:
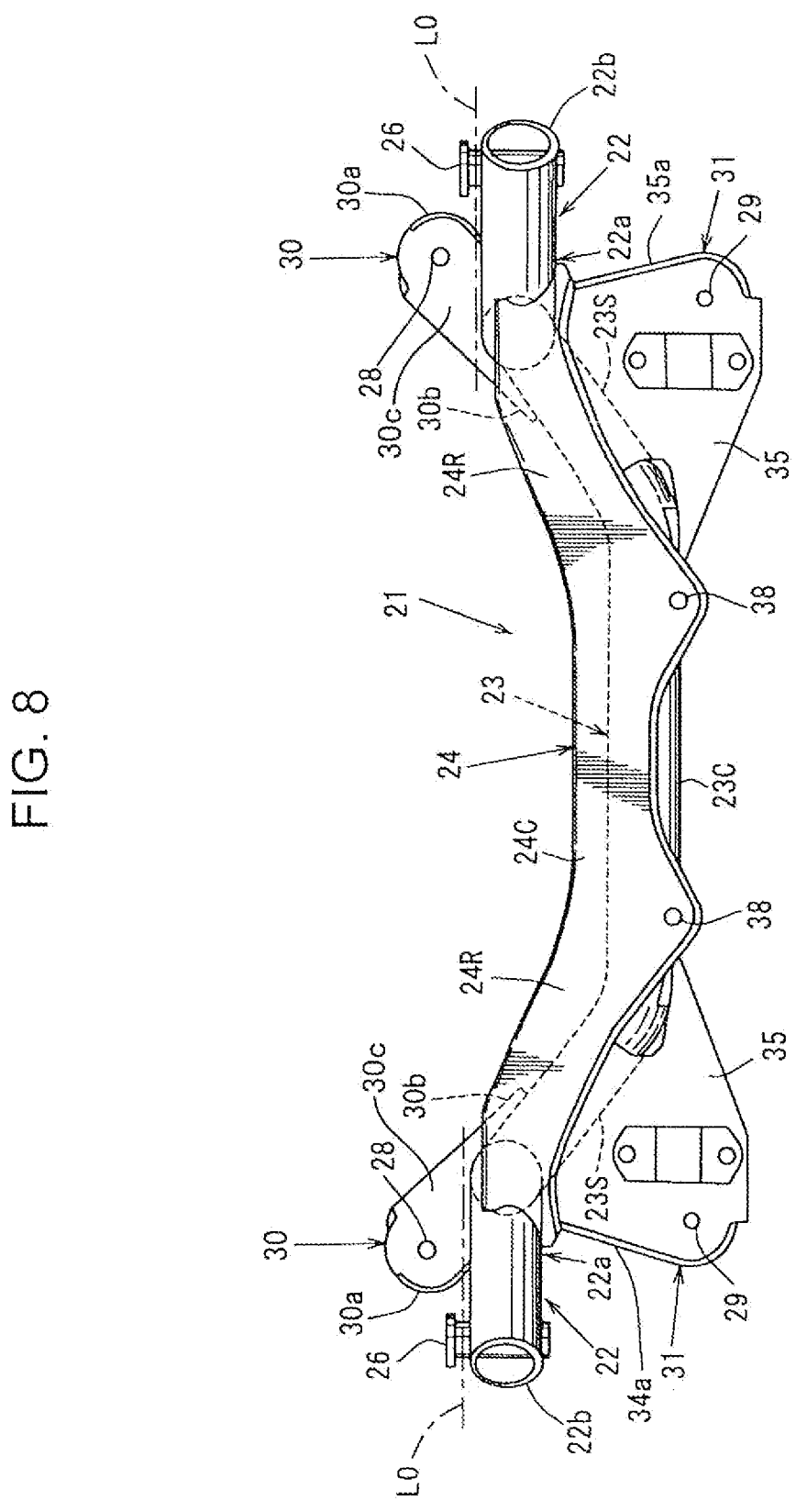

Now, suppose that a line passing through both the front fixing section 25 and the rear fixing section 26 is an imaginary line L0, as illustrated in FIGS. 6 to 8, etc. Because of the above positional relationship between the two front fixing sections 25, 26, the imaginary line L0 is set to extend obliquely forwardly and inwardly in the vehicle width direction (FIG. 6), in top plan view, and parallel to a horizontal plane, in front view (FIGS. 7 and 8).

As illustrated in FIG. 1, the rear ends of the right and left side member segments 22, 22 are mounted, respectively, to the right and left rear side frames 7, through the rear fixing sections 26 of the right and left side member segments 22, 22. On the other hand, the front ends of the right and left side member segments 22, 22 are mounted, respectively, to right and left ends of the No. 4 cross member 10 at positions located inward of the right and left rear side frames 7 in the vehicle width direction, through the front fixing sections 25 of the right and left side member segments 22. Specifically, the rear fixing section 26 is fixed to the mounting point 19 of the rear side frame lower panel 7L (FIG. 2), and the front fixing section 25 is fixed to the mounting point 10P of the cross member lower panel 10L (FIG. 2). In this way, the side member segment 22 is mounted to the vehicle body at two spots: the front fixing section 25 and the rear fixing section 26.

As illustrated in FIGS. 4 to 8, the front cross member segment 23 is provided to extend in the vehicle width direction, and right and left ends of the front cross member segment 23 are joined, respectively, to front portions 22d (linearly-extending portions in the front-rear direction) of the right and left side member segments 22, 22. Specifically, the front cross member segment 23 comprises: right and left lateral portions 23S, 23S each extending obliquely downwardly and inwardly in the vehicle width direction from a respective one of the front portions 22d of the right and left side member segments 22; and a horizontal central portion 23C coupling the right and left lateral portions 23S, 23S together in the vehicle width direction. These portions are composed entirely of a pipe-like shaped member.

The rear cross member segment 24 is provided to extend in the vehicle width direction, and right and left ends thereof are joined, respectively, to rear portions 22b of the right and left side member segments 22, 22. Specifically, the rear cross member segment 24 comprises: a central portion 24C extending in the vehicle width direction at a position forward of the rear fixing section 26 of the side member segment 22; and a set of a front branch portion 24F and a rear branch portion 24R branched forwardly and rearwardly from each of the right and left ends of the central portion 24C, while extending in the vehicle width direction.

The rear branch portion 24R extends obliquely rearwardly and outwardly in the vehicle width direction from each of vehicle-widthwise outer ends of the central portion 24C to the rear fixing section 26 of the side member segment 22, and the front branch portion 24F extends obliquely in a direction opposite to that of the rear branch portion 24R (i.e., obliquely forwardly and outwardly in the vehicle width direction). Vehicle-widthwise outer ends of the set of branch portions 24R, 24F branched in a two-forked shape are joined to the side member segment 22, so that a so-called truss structure is formed by these three components: the side member segment 22, the front branch portion 24F and the rear branch portion 24R. This truss structure makes it possible to reinforce the rear cross member segment 24 itself and the rear subframe 21, while suppressing an increase in weight.

Figure 11:
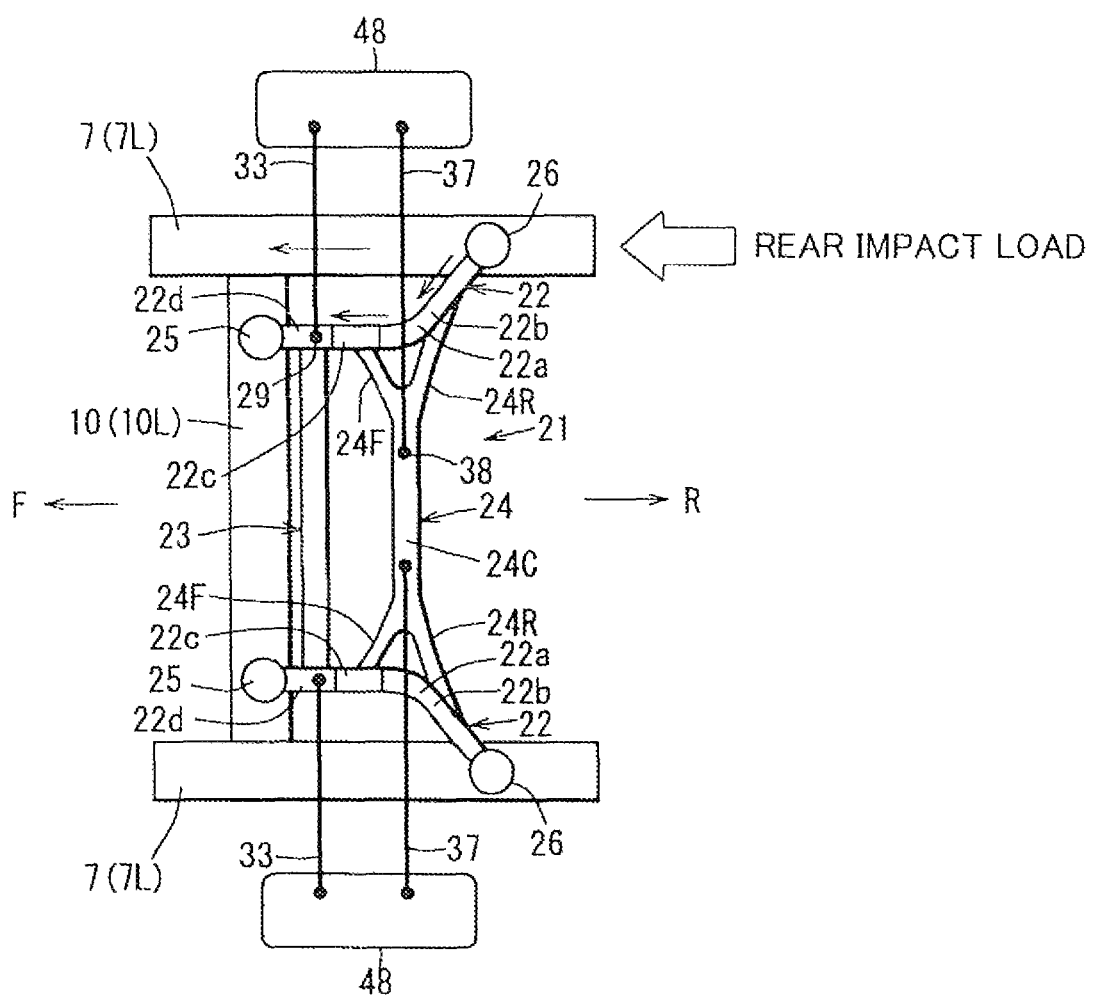
FIG. 11 is a bottom view schematically illustrating the rear subframe mounting structure.
Figure 12:
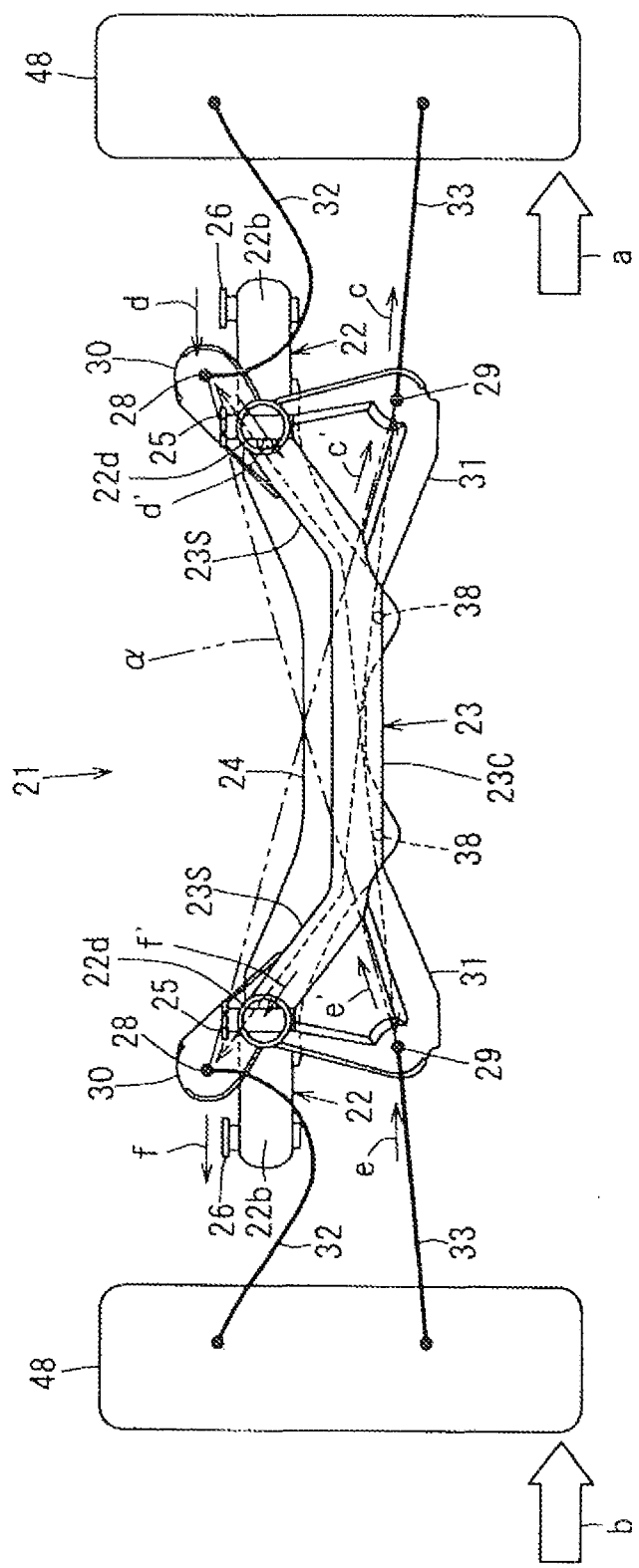
FIG. 12 is an explanatory diagram of an operation during input of same-phase lateral forces.
Figure 13:
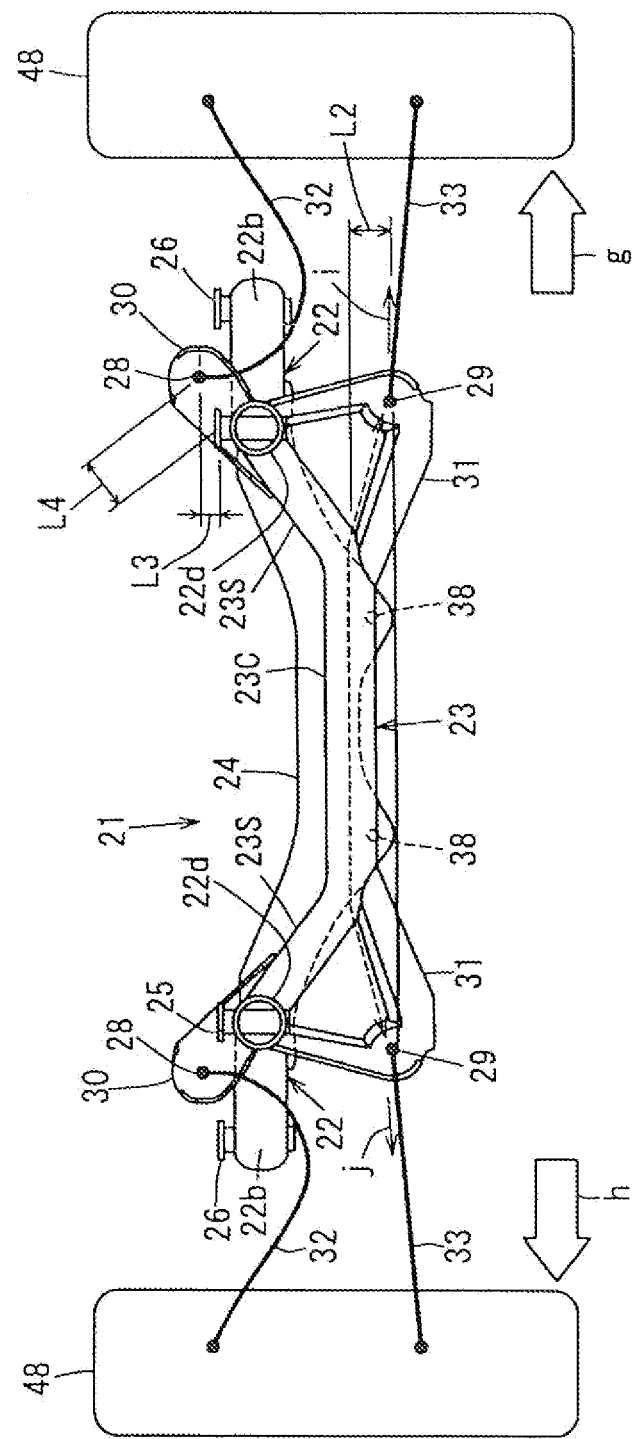
FIG. 13 is an explanatory diagram of an operation during input of different-phase lateral forces.

FIGS. 11 to 13 schematically illustrate a rear vehicle body structure in this embodiment. As illustrated in FIGS. 11 to 13 and FIG. 1, the rear suspension comprises: a front upper arm 32; a front lower arm 33 located below the front upper arm 32; a rear lower arm 37 located rearward of the front lower arm 33; a suspension spring 27 composed of a coil spring; and a trailing arm 49.

Each of the front upper arm 32, the front lower arm 33 and the rear lower arm 37 is provided to extend in the vehicle width direction to couple a rear wheel 48 (more specifically, a wheel support which is a mounting portion for a disc wheel 47 holding the rear wheel 48) and the rear subframe 21 together. The trailing arm 49 is provided to extend in the front-rear direction to couple the wheel support of the rear wheel 48 and the front portion of the rear side frame 7. The arms 32, 33, 37, 49 have a function of controlling an up-down movement of the rear wheel 48.

Further, as illustrated in FIGS. 1 and 3, in order to additionally serve as a spring seat for the suspension spring 27, the rear lower arm 37 has a portion expanded correspondingly to the spring 27, at a position opposed to the spring seat 18 (see FIG. 2) of the rear side frame lower panel 7L, in an up-down direction.

In this embodiment, as illustrated in the bottom view in FIG. 11 and the front views in FIGS. 12 and 13, the front upper arm 32 and the front lower arm 33 are provided to extend in the vehicle width direction in approximately parallel relation. The front upper arm 32 has a downwardly-concaved curved shape for avoiding interference with the rear side frame 7.

In this embodiment, as illustrated in FIG. 11 and FIG. 1, in order to ensure a toe-in (a toe angle in a state in which a front side of the rear wheel 48 is located inward in the vehicle width direction with respect to a rear side of the rear wheel 48), an arm length of the front arm (each of the front upper arm 32 and the front lower arm 33) is set to be less than an arm length of the rear lower arm 37. The term "arm length" herein means a linear distance between opposite ends of the arm in the vehicle width direction (this also applies to the following description).

Further, in order to ensure a negative camber (a camber angle at which right and left rear wheels 48, 48 are arranged to form a truncated chevron shape), an arm length of the front upper arm 32 is set to be less than an arm length of the front lower arm 33.

As illustrated in FIGS. 4 and 6, an upper-arm support section 28 located above the front fixing section 25 and a lower-arm support section 29 located below the side member segment 22 are provided on the front portion 22*d* of the side member segment 22 at positions rearward of the front fixing section 25. The front upper arm 32 is pivotally supported by the upper-arm support section 28, and the front lower arm 33 is pivotally supported by the lower-arm support section 29.

In this embodiment, each of the upper-arm support section 28 and the lower-arm support sub-section 29 is formed by a part of a bracket (aftermentioned upper-arm support bracket 30 and lower-arm support bracket 31) attached to the side member segment 22.

That is, as illustrated in FIGS. 4 and 7, an upper-arm support bracket 30 (hereinafter abbreviated and referred to simply and occasionally as "the bracket 30") is attached to the front portion 22*d* of the side member segment 22 (at a position rearward of and adjacent to the front fixing section 25), and the upper-arm support section 28 is formed in the bracket 30. The bracket 30 is provided to extend along an extension line extending outwardly in the vehicle width direction from each of the right and left lateral portions 23S of the front cross member segment 23, i.e., provided to protrude outwardly in the vehicle width direction and upwardly from the side member segment 22. Although the upper-arm support section 28 is provided in an upper portion of the bracket 30, a position thereof in the vehicle width direction is set to be located adjacent to the front fixing section 25.

Further, a lower-arm support bracket 31 (hereinafter abbreviated and referred to simply and occasionally as "the bracket 31") extending outwardly in the vehicle width direction and downwardly from the side member segment 22 is attached to the front portion 22*d* of the side member segment 22 (at a position rearward of and adjacent to the front fixing section 25), and the lower-arm support section 29 is formed in the bracket 31. Although the lower-arm support section 29 is provided in a lower portion of the bracket 31, a position thereof in the vehicle width direction is set to be located adjacent to the front fixing section 25.

In FIG. 7, an middle position in the up-down direction between the upper-arm support section 28 and the lower-arm support section 29 is indicated by an imaginary line L1. On the other hand, a height position of the central portion 23C of the front cross member segment 23 is set to be located below the middle position (imaginary line L1) in the up-down direction between the upper-arm and lower-arm support sections 28, 29.

As above, in this embodiment, the brackets 30, 31 including the upper-arm support section 28 and the lower-arm support section 29 are provided on the front portion 22*d* of the side member segment 22 (at positions rearward of and adjacent to the front fixing section 25), and the front upper arm 32 and the front lower arm 33 of the rear suspension is pivotally supported by the arm support sections 28, 29, respectively. The bracket 30 including the upper-arm support section 28, the bracket 31 including the lower-arm support section 29, and each of the right and left ends of the front cross member segment 23 (an vehicle-widthwise outer end of the lateral portion 23S), are arranged in such a manner that positions thereof in the front-rear direction overlap each other. Particularly, in this embodiment, as illustrated in FIGS. 6 to 9, the brackets 30, 31 and each of the right and left ends of the front cross member segment 23 are arranged at approximately the same position of the side member segment 22 in the front-rear direction, in a concentrated manner.

As illustrated in FIGS. 6 to 9, the bracket 30 including the upper-arm support section 28 comprises a base portion 30*c* having an angular-C shaped cross-section, a pair of front and rear flange portions 30*a* protruding forwardly and rearwardly from the base portion 30*c*, and an extension portion 30*b* extending inwardly in the vehicle width direction from the base portion 30*c*. The front and rear flange portions 30*a* of the bracket 30 are arranged in spaced-apart relation in the front-rear direction, and joined to an outer lateral surface of the side member segment 22, individually. The extension portion 30*b* is disposed to extend obliquely downwardly and inwardly in the vehicle width direction (i.e., in approximately the same direction of the lateral portion 23S of the front cross member segment 23) from the base portion 30*c*, and joined to an upper surface of the vehicle-widthwise outer end of the front cross member segment 23.

The use of the bracket 30 configured as above makes it possible to prevent tilting of the bracket 30 in the front-rear direction, and ensure sufficient joining strength against a lateral force (load in the vehicle width direction).

As illustrated in FIGS. 4 to 9, the bracket 31 including the lower-arm support section 29 comprises: a front panel 34 and a rear panel 35 each formed in an approximately triangular shape in front view and disposed in spaced-apart relation in the front-rear direction; and a side panel 36*a* and a lower panel 36*b* each connecting the front and rear panels 34, 35 together in the front-rear direction. The side panel 36*a* is provided to close an opening facing outwardly in the vehicle width direction between the front and rear panels 34, 35, and the lower panel 36*b* is provided to close a downwardly-facing opening between the front and rear panels 34, 35. A lower edge of the side panel 36*a* is not continuous with a vehicle-widthwise outer edge of the lower panel 36*b*, so that an opening facing outwardly in the vehicle width direction is defined therebetween. The lower-arm support section 29 is located at a position adjacent to the opening.

Each of the front and rear panels 34, 35 is joined to a lower surface of the side member segment 22, and a lower surface of the front cross member segment 23 (more specifically, a region of the lower surface ranging from each of right and left ends of the central portion 23C to the vehicle-widthwise outer end of each of the lateral portion 23S). Further, the front panel 34 is integrally formed with a forwardly-protruding flange portion 34*a*, and the rear panel 35 is integrally formed with a rearwardly-protruding flange portion 35*a*. Each of the flange portions 34*a*, 35*a* is joined to the side member segment 22. A joining width of the bracket 31 in the front-rear direction with respect to the side member segment 22 is increased by a length equal to those of the flange portions 34*a*, 35*a*.

As illustrated in FIGS. 7 and 8, a joining range in the vehicle width direction between the bracket 31 and the front cross member segment 23 is set to be greater than a joining range in the vehicle width direction between the bracket 30 and the front cross member segment 23.

Further, as illustrated in FIGS. 4 and 7, supposing that, in a joined region between the bracket 31 and the front cross member segment 23, more specifically, in a joined region between the bracket 31 and the vehicle-widthwise outer end of the central portion 23C of the front cross member segment 23, an angle defined between a lower surface of the bracket 31 and the central portion 23C is φ1, the angle φ1 is set to an obtuse angle.

The use of the bracket 31 configured as above makes it possible to prevent tilting of the bracket 31 in the front-rear direction, and ensure sufficient joining strength against a lateral force (load in the vehicle width direction).

As illustrated in FIG. 7, supposing that a distance in the up-down direction from the joined region between the bracket 30 and the side member segment 22 to the upper-arm support section 28 is D1, and a distance in the up-down direction from the joined region between the bracket 31 and the side member segment 22 to the lower-arm support section 29 is D2, the two distances are set to satisfy the following relationship: the distance D1 in the upper-arm support section 28 is less than the distance D2 in the lower-arm support section 29.

Figure 9:
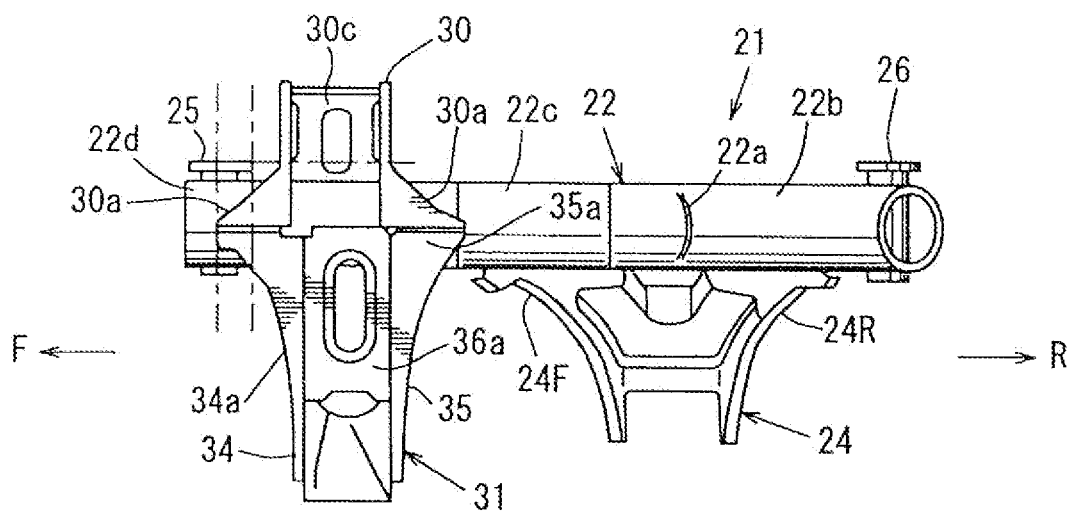
FIG. 9 is a side view of the rear subframe.

As illustrated in FIG. 9, the upper-side and lower-side brackets 30, 31 are joined to the side member segment 22 in spaced-apart relation to each other without being joined together. That is, each of the flange portions 30a of the upper-side bracket 30 and the flange portions 34a, 35a of the lower-side bracket 31 is formed to extend in the front-rear direction, and joined to the lateral surface of the side member segment 22, as mentioned previously. However, a set of the flange portions 30a and a set of the flange portions 34a, 35a are joined to the side member segment 22 in adjacent relation to each other in the up-down direction, without being joined together.

Each of the front flange portion 30a of the bracket 30 and the front flange portion 34a of the bracket 31 is joined to the side member segment 22 at a position where it partially overlaps the front fixing section 25 of the side member segment 22, in side view. That is, each of the brackets 30, 31 is disposed in such a manner that a position thereof in the front-rear direction overlaps that of the front fixing section 25.

As illustrated in FIG. 7, the extension portion 30b of the bracket 30 is joined to the front cross member segment 23 at a position below an up-down directional center C of the lateral surface of the side member segment 22.

As illustrated in FIG. 4, the rear cross member segment 24 of the rear subframe 24 is disposed to extend in the vehicle width direction at a position spaced apart rearwardly from the lower-arm support section 29 and the front cross member segment 23, and couple the rear portions 22b, 22b of the right and left side member segments 22, 22 together. The central portion 24C of the rear cross member segment 24 is provided with a pair of right and left rear-lower-arm support sections 38, 38, and the rear lower arms 37 of the rear suspension illustrated in FIGS. 1, 3 and 11 are pivotally supported, respectively, by the rear-lower-arm support sections 38, 38. In this embodiment, the rear-lower-arm support sections 38, 38 are provided, respectively, in lower regions of the right and left ends of the central portion 24C.

As mentioned above, each of the right and left lateral portions of the rear cross member segment 24 (a region of the rear cross member segment 24 located outward of the rear-lower-arm support section 38 in the vehicle width direction) is formed as the set of the front branch portion 24F and the rear branch portion 24R which are branched in a two-forked shape. The vehicle-widthwise outer ends of the set of branch portions 24F, 24R are joined, respectively, to two spots of the side member segment 22 located in rearwardly spaced-apart relation, more specifically, the rear portion 22b of the side member segment 22 located at a position adjacent to the rear fixing section 26, and an intermediate portion 22c of the side member segment 22 spaced apart forwardly from the rear portion 22b.

The side member segment 22 has a bent portion 22a between a pair of front and rear coupling portions of the side member segment 22 to which the front branch portion 24F and the rear branch portion 24R are respectively joined, i.e., between the intermediate portion 22c of the side member segment 22 to which the front branch portion 24F is coupled, and the rear portion 22b of the side member segment 22 to which the rear branch portion 24R is coupled. The bent portion 22a has an axis extending in a curved manner.

That is, a part of the side member segment 22a on a front end side thereof is formed as the front portion 22d and the intermediate portion 22c each extending linearly in the front-rear direction, whereas the rear portion 22b of the side member segment 22a is formed to extend obliquely rearwardly and outwardly in the vehicle width direction. Then, the bent portion 22a having an inclination angle gradually increasing toward the rear side (gradually bending outwardly in the vehicle width direction) is formed between the rear portion 22b and the intermediate portion 22c of the side member segment 22. The front branch portion 24F of the rear cross member segment 24 is coupled to the intermediate portion 22c located frontward of the bent portion 22a, and the rear branch portion 24R of the rear cross member segment 24 is coupled to the rear portion 22b located rearward of the bent portion 22a.

As illustrated in FIGS. 4 and 6, supposing that, in a coupled region between the rear branch portion 24R and the rear portion 22b of the side member segment 22, an intersecting angle defined in a rear side of the coupled region is φ2, the angle φ2 is set to an obtuse angle.

It can also be said that the bent portion 22a of the side member segment 22 is bent to avoid interference with the suspension spring 27 of the rear suspension. That is, as illustrated in FIG. 1, the suspension spring 27 is provided at a position spaced apart outwardly in the vehicle width direction from the side member segment 22 and at approximately the same position in the front-rear direction as that of the rear cross member segment 24. On the other hand, the bent portion 22a and the rear portion 22b in the side member segment 22 are curved to take a roundabout route extending from a vehicle-widthwise inner side toward a rear side of the suspension spring 27, i.e., formed in a shape capable of avoiding the interference with the suspension spring 27. This makes it possible to achieve both of distribution of a rear impact load by the side member segment 22 and layout of the suspension spring 27.

As illustrated in FIG. 3, each of the bent portion 22a and the rear portion 22b of the side member segment 22 has a wall thickness set to be less than that of a remaining region (the front portion 22d and the intermediate portion 22c) of the side member segment 22. Further, the wall thickness of the intermediate portion 22c of the side member segment 22 is set to be greater than the wall thickness of the bent portion 22a or the rear portion 22b, and the wall thickness of the front portion 22d of the side member segment 22 is set to be greater than the wall thickness of the intermediate portion 22c. That is, comparing the portions of the side member segment 22 in terms of a wall thickness, they have the following relationships: (the front portion 22d)>(the intermediate portion 22c)>(each of the bent portion 22a and the rear portion 22b).

As above, the side member segment 22 is configured such that a wall thickness thereof becomes thinnest in the rear portion 22b to which the rear branch portion 24R of the rear cross member segment 24 is coupled, and in the bent portion 22a located between the rear branch portion 24R and the front branch portion 24F. Further, the wall thickness of the intermediate portion 22c to which the front branch portion 24F is coupled is set to become second-thickest, and the wall thickness of the front portion 22d located forward of the intermediate portion 22c is set to become thickest. In other words, the bent portion 22a of the side member segment 22 located between the front and rear branch portions 24F, 24R (and the rear portion 22b located rearward of the bent portion 22a) is formed as a weakened portion having a rigidity weaker than those of the intermediate portion 22c and the front portion 22d each located forward of the bent portion 22a.

The side member segment 22 having the front portion 22d, the intermediate portion 22c, the bent portion 22a and the rear portion 22b having different wall thicknesses as mentioned above is prepared, for example, by a so-called tailor welded blank process in which a plurality of steel plates having different plate thickness are joined by means of laser welding, plasma welding or the like, and then subjected to press forming, or a so-called tailor rolled blank process in which a steel plate having various thicknesses is formed by appropriately adjusting a clearance between rolls during rolling.

As illustrated in FIGS. 7 and 8, both of the lower-arm support section 29 for supporting the front lower arm 33 and the rear-lower-arm support section 38 for supporting the rear lower arm 37 are provided at positions spaced apart downwardly from the imaginary line L0 (line passing through both the front fixing section 25 and the rear fixing section 26).

The rear-lower-arm support section 38 is provided at a position spaced apart inwardly in the vehicle width direction from the lower-arm support section 29. Further, the rear-lower-arm support section 38 is provided at a position above the lower-arm support section 29 (i.e., closer to the imaginary line L0 in the up-down direction).

Figure 10:
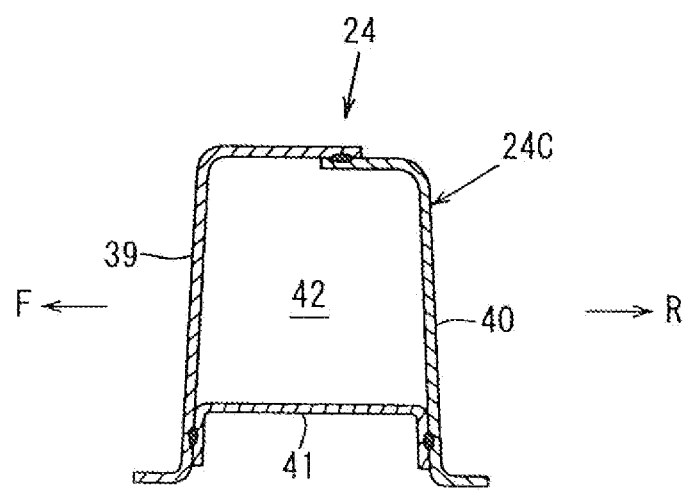
FIG. 10 is a sectional view taken along the arrowed line X-X in FIG. 6.

FIG. 10 is a sectional view taken along the arrowed line X-X in FIG. 6. As illustrated in FIG. 10, the rear cross member segment 24 is formed by joining a front member 39 composed of a plate bent into a reverse-L shape, and a rear member 40 composed of a plate bent into an L shape, together. Particularly, as represented by the cross-section in FIG. 10, the central portion 24C of the rear cross member segment 24 has a stiffener 41 joined to lower portions of the front and rear members 39, 40 to serve as a reinforcing member, so that a closed cross-section 42 extending in the vehicle width direction is defined by these three components (39, 40, 41). This closed cross-section structure makes it possible to achieve rigidity enhancement of the central portion 24C of the rear cross member segment 24, while suppressing an increase in weight.

Further, in this embodiment, as represented by the perspective view in FIG. 5, the stiffener 41 is provided not only in the central portion 24C but also a vehicle-widthwise midway position of the front branch portion 24F and the rear branch portion 24R of the rear cross member segment 24. This makes it possible to additionally enhance rigidity of the front and rear branch portions 24F, 24R, thereby effectively further reinforcing the rear cross member segment 24 without causing any increase in the number of components.

As illustrated in FIG. 3, the front fixing section 25 of the side member segment 22 is fastened and fixed to a nut 44 supported inside the closed cross-section 12 of the cross member lower panel 10L by a reinforcement 43, from below the cross member lower panel 10L through the use of a bolt 45. In the same manner, the rear fixing section 26 of the side member segment 22 is fastened and fixed to the rear side frame lower panel 7L from therebelow, using a bolt 46.

<Description of Operation>

Next, an operation of the embodiment illustrated in FIGS. 1 to 13 will be described. The vehicle body structure disclosed in the above embodiment is equipped with the rear subframe 21 supporting the arms 32, 33, 37, 38 of the rear suspension. The rear subframe 21 comprises: the pair of right and left side member segments 22, 22; the front cross member segment 23 coupling the front portions 22d of the side member segments 22 together; and the rear cross member segment 24 coupling the side member segments 22 together, at a position spaced apart rearwardly from the front cross member segment 23. The rear cross member segment 24 has the central portion 24C extending in the vehicle width direction between the side member segments 22, and the front branch portion 24F and the rear branch portion 24R branched forwardly and rearwardly from each of vehicle-widthwise outer ends of the central portion 24C, while extending in the vehicle width direction. Each of the side member segments 22, 22 has the bent portion 22a with its axis extending in a curved manner between the coupling portion (intermediate portion 22c) between the front branch portion 24F and the side member segment 22, and the coupled portion (rear portion 22b) between the rear branch portion 24R and the side member segment 22. The bent portion 22a has a wall thickness set to be less than that of a region (the intermediate portion 22c and the front portion 22d) of the side member segment 22 located forward of the bent portion 22a.

This mounting structure has the following advantageous effects.

The branch portions (the front branch portion 24F, the rear branch portion 24R) formed by branching each lateral portion of the rear cross member segment 24 in a two-forked shape are coupled, respectively, to two front and rear portions of the side member segment 22, and a portion of the side member segment 22 between the front and rear coupling portions is formed as the bent portion 22a having a relatively thin wall thickness, so that it becomes possible to allow a vicinity of the coupled region between the rear cross member segment 24 and the side member segment 22 which has not heretofore been positively utilized as a shock absorbing member during a rear collision, to easily undergo deformation by using the bent portion 22a as a trigger point, while downsizing the entire rear subframe 21 including the side member segment 22 in the front-rear direction. For example, it is possible to allow the rear portion 22b and the bent portion 22a of the side member segment 22 to be compressively deformed while being bendingly deformed outwardly in the vehicle width direction. Based on this deformation, a rear impact load (impact load input during a rear collision) is effectively absorbed, so that vehicle safety during a rear collision can be enhanced.

In addition, a truss structure is formed by the front branch portion 24F, the rear branch portion 24R and the side member segment 22, so that it becomes possible to, in a normal state, sufficiently ensure rigidity of the rear subframe 21, and enhance rigidity for supporting the arms 32, 33, 37, 38 of the rear suspension, without providing any special reinforcing member.

In essence, it becomes possible to enhance the rigidity for supporting the arms 32, 33, 37, 38 of the rear suspension while achieving downsizing, weight reduction and rigidity enhancement of the rear subframe 21, and, during a vehicle rear collision, sufficiently absorb a rear impact load by means of deformation of the relatively easily deformable rear subframe 21.

In the above embodiment, the fuel tank 14 is disposed forward of the front cross member segment 23 of the rear subframe 21.

According to this configuration, it becomes possible to prevent interference between the rear subframe 21 and the fuel tank 14 during a vehicle rear collision. That is, in the above embodiment, during a vehicle rear collision, the vicinity of the coupled region between the rear cross member segment 24 and the side member segment 22 is positively deformed, and accordingly a rear impact load is sufficiently absorbed, so that it becomes possible to suppress forward displacement of the rear subframe 21, as mentioned above. Therefore, it becomes possible to avoid interference of the front cross member segment 23 of the rear subframe 21 with the fuel tank 14.

Further, as mentioned above, the entire rear subframe 21 is reduced in size in the front-rear direction, so that a layout area of the fuel tank 14 can be expanded toward the rear subframe 21 (rearwardly).

In the above embodiment, the side member segment 22 has the front end provided with the front fixing section 25 mounted to the No. 4 cross member 10 (first vehicle-body component), and the rear end provided with the rear fixing section 26 mounted to the rear side frame 7 (second vehicle-body component). A region (the rear portion 22b) of the side member segment 22 between the rear fixing section 26 and the bent portion 22a extends obliquely along a rearward extending direction of the bent portion 22a (in the above embodiment, obliquely rearwardly and outwardly in the vehicle width direction).

According to this configuration, a load input from the rear fixing section 26 is transmitted forwardly in a smooth manner, so that it becomes possible to suppress the occurrence of stress concentration between the rear fixing section 26 and the bent portion 22a. Thus, even if the wall thickness is reduced, strength necessary in a normal state can be ensured, so that it becomes possible to further promote weight reduction and rigidity enhancement of the rear subframe 21.

Further, during a vehicle rear collision, an impact load (rear impact load) is input from the rear fixing section 26 mounted to the rear end of the rear side frame 7. This impact load is transmitted to the No. 4 cross member 10 via the side member segment 22, and further distributed from the No. 4 cross member 10 to a member other than the rear side frame 7, such as a vehicle-body floor panel, as indicated by the arrowed lines in FIG. 11. In this way, distribution of a rear impact load can be achieved, so that it becomes possible to suppress forward displacement of the rear subframe 21 and deformation of a vehicle-body component located forward of the rear subframe 21, which would otherwise be caused by the rear impact load, and further improve collision safety.

In the above embodiment, the side member segment 24 has the intermediate portion 22c in the front-rear direction to which the front branch portion 24F of the rear cross member segment 24 is coupled. The intermediate portion 22c has a wall thickness greater than that of the bent portion 22a.

According to this configuration, the side member segment 22 and the rear cross member segment 24 are coupled together with high rigidity, so that it becomes possible to, during a vehicle rear collision, reliably transmit and distribute a rear impact load input from the rear fixing section 26 into the side member segment 22, toward the vehicle body (No. 4 cross member 10) via the entire rear subframe 21, and suppress forward displacement of the side member segment 22. In addition, it becomes possible to suppress vibration of the side member segment 22 during a normal state, and noise due to the vibration.

Further, the wall thickness is changed in the vicinity of a boundary region between the intermediate portion 22c and the bent portion 22a located rearward of the intermediate portion 22c, in the side member segment 22, so that it becomes possible to, during a vehicle rear collision, allow the bent portion 22a to positively undergo deformation by using the boundary region as a trigger point.

In the above embodiment, the intersecting angle $\phi 2$ defined in the rear side of the coupling portion between the side member segment 22 and the rear branch portion 24R of the rear cross member segment 24 is set to an obtuse angle (see FIGS. 3 to 6).

According to this configuration, during a vehicle rear collision, a load input from the rear fixing section 26 into the rear portion 22b of the side member segment 22 can be smoothly transmitted to the rear cross member segment 24 without largely changing a pathway, so that it becomes possible to further enhance load transmissibility in the vehicle width direction.

In the above embodiment, the rear cross member segment 24 has the central portion 24C provided with the rear-lower-arm support section 38 by which the rear lower arm 37 of the rear suspension is pivotally supported.

According to this configuration, a load input from the rear lower arm 37 can be distributed frontwardly and rearwardly via the branch portions (the front branch portion 24F, the rear branch portion 24R) of the rear cross member segment 24, so that it becomes possible to further enhance the rigidity for supporting the rear lower arm 37.

In addition, the position of the rear-lower-arm support section 38 is set on a vehicle-widthwise inner side, and thereby the rear lower arm 37 has a relatively long arm length, so that it becomes possible to suppress a change in toe angle, etc., during an up-down movement of a wheel.

In the above embodiment, particularly as illustrated in the bottom view in FIG. 11, the rear end (the rear fixing section 26) of the side member segment 22 is mounted to the rear side frame 7, and the front end (the front fixing section 25) of the side member segment 22 is mounted to the No. 4 cross member 10 located inward of the rear side frame 7 in the vehicle width direction.

According to this configuration, as compared to the case where the front fixing section 25 is mounted to the rear side frame 7, a distance in the vehicle width direction between the arm support section, particularly, the lower-arm support section 29, and the front fixing section 25, can be reduced, so that it becomes possible to achieve weight reduction and rigidity enhancement while ensuring an arm length of the front lower arm 33.

In the above embodiment, the front upper arm 32 and the front lower arm 33 are provided to extend in the vehicle width direction in approximately parallel relation to each other, and the upper-arm support section 28 and the lower-arm support section 29 supporting the respective upper arms 32, 33 are set at approximately the same position in the front-rear direction as that of the front cross member segment 23.

According to this configuration, it becomes possible to efficiently receive a lateral force input from the front upper arm 32 and the front lower arm 33 by the front cross member segment 23, and suppress a bending moment in the front-rear direction applied to the side member segment 22.

Next, with reference to FIG. 12, an operation in a situation where same-phase lateral forces (lateral forces causing the right and left rear wheels 48 to tilt in the same side) are input during turning of a vehicle or the like will be described. In FIG. 12, the vehicle is viewed rearwardly from a front side thereof. Thus, a right side of the drawing corresponds to a left side of the vehicle, and a left side of the drawing corresponds to a right side of the vehicle.

When the same-phase lateral forces b, a are input, respectively, into the right and left rear wheels 48, a pulling force c and a pushing force d are applied, respectively, to the left lower arm 33 and the left upper arm 32, and a pushing force e and a pulling force f are applied, respectively, to the right lower arm 33 and the right upper arm 32.

As is clear from FIG. 12, in the body structure according to the above embodiment, the upper-arm support bracket 30, the lateral portion 23S and the central portion 23C of the front cross member segment 23, and the lower-arm support bracket 31 connect generally along a straight line obliquely extending in a direction from a right upper region to a left lower region of the vehicle or from a left upper region to a right lower region of the vehicle. Thus, paths connecting between respective ones of the left arm support sections 28, 29 and the right arm support sections 28, 29 diagonally cross to form an X shape, so that oblique forces c', d', e', f indicated by the arrowed lines in FIG. 12 are applied from the brackets 30, 31 to the front cross member segment 23. Therefore, the left pulling force c' and the right pulling force f cancel each other out, and the right pushing force e' and the left pushing force d' cancel each other out, so that it becomes possible to cancel out the same-phase lateral forces. In FIG. 12, load transmission paths forming an ideal X shape are indicated by the two-dot chain lines a.

Next, with reference to FIG. 13, an operation in a situation where different-phase lateral forces are input, respectively, into the right and left rear wheels 48, during traveling on tucks or bumpy road, will be described. In FIG. 13, the vehicle is viewed rearwardly from a front side thereof. Thus, a right side of the drawing corresponds to a left side of the vehicle, and a left side of the drawing corresponds to a right side of the vehicle.

When the different-phase lateral forces h, g are input, respectively, into the right and left rear wheels 48, a pulling force i and a pulling force j are applied, respectively, to the left lower arm 33 and the right lower arm 33.

As is clear from FIG. 13, in the vehicle body structure disclosed in the above embodiment, an amount of offset (distance L2) in the up-down direction between the central portion 23C of the front cross member segment 23 and the lower-arm support section 29 is set to a relatively small value. That is, the central portion 23C of the front cross member segment 23 is disposed between the upper-arm support section 28 and the lower-arm support section 29, at a position closer to the lower-arm support section 29. Further, each of an amount of offset (distance L3) in the up-down direction between the front fixing section 25 and the upper-arm support section 28 of the side member segment 22 and a linear distance L4 therebetween is also set to a relatively small value. This makes it possible to enhance rigidity of the brackets 30, 31 and the front cross member segment 23, and allow the relatively large pulling forces j, i input into the right and left lower arms 33 (pulling forces greater than loads input, respectively, into the right and left upper arms 32) to cancel each other out via the central portion 23C of the front cross member segment 23, thereby cancelling out the different-phase lateral forces.

Figure 14A:
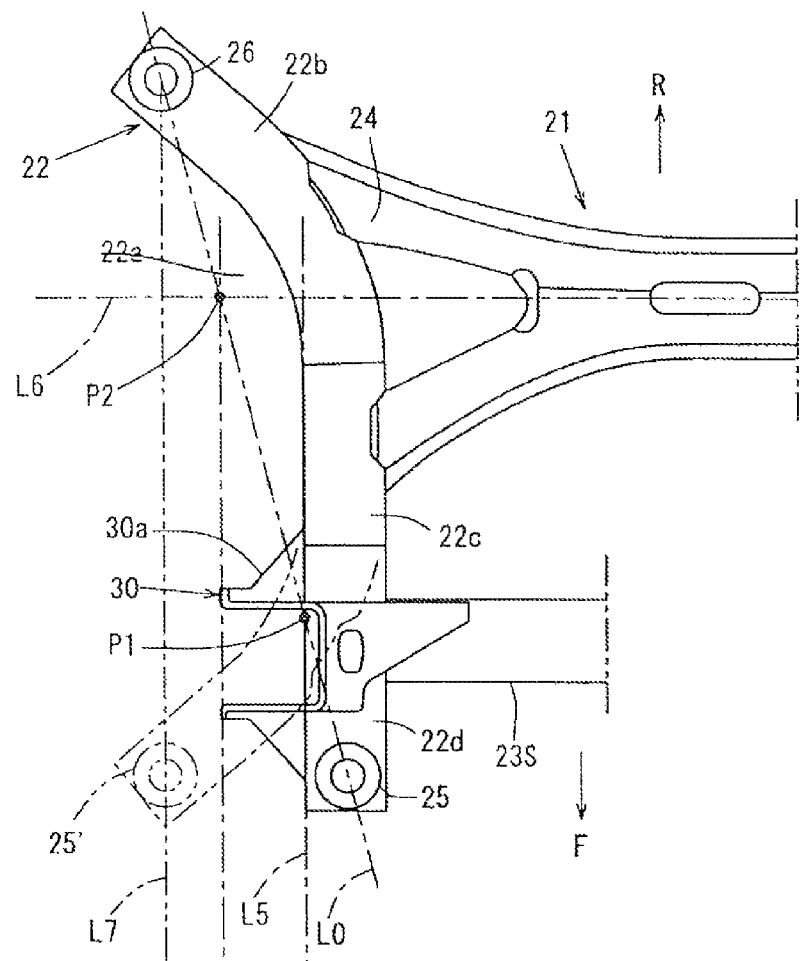
FIG. 14 is an explanatory diagram illustrating a change in suspension geometry during input of a lateral force.
Figure 14B:
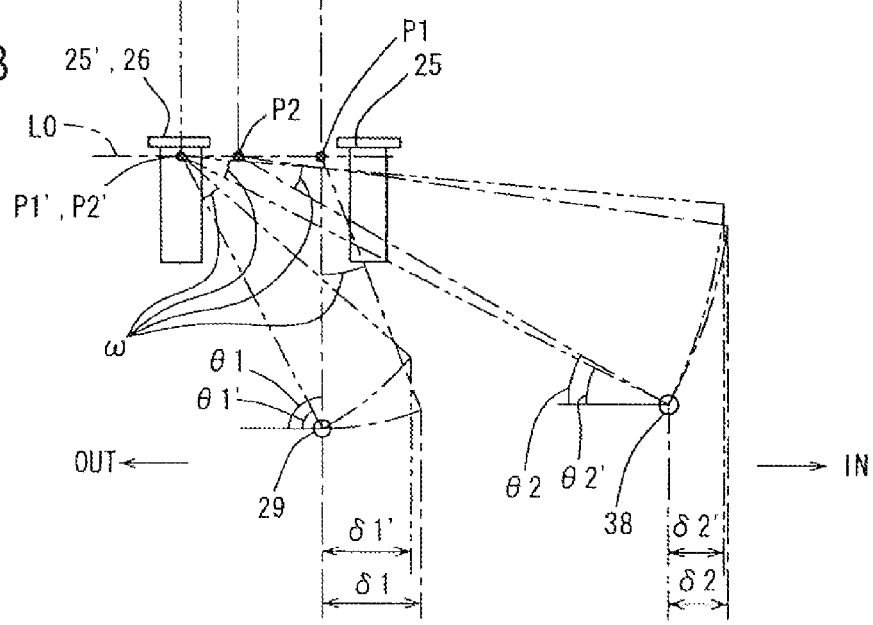

Next, with reference to FIG. 14, a change in suspension geometry in a situation where the rear subframe 21 is swingingly displaced due to an input of a lateral force will be described. FIG. 14(a) is a top plan view of the rear subframe 21, and FIG. 14(b) is a front view schematically illustrating a state of a change in suspension geometry. Because the rear subframe 21 is formed bilaterally symmetrically, a change in suspension geometry occurs on either side of the rear subframe 21 in the same manner. Thus, FIG. 14 illustrates only the right side of the rear subframe 21, and the following description will be basically made about a change in right-side suspension geometry. In FIG. 14(b), for the sake of simplicity of illustration, only a positional relationship of the front fixing section 25 (25'), the rear fixing section 26, the lower-arm support section 29 and the rear-lower-arm support section 38 is illustrated, and illustration of the remaining configuration is omitted. In this figure, the arrowed line IN indicates an inward direction with respect to the vehicle, and the arrowed line OUT indicates an outward direction with respect to the vehicle.

When a lateral force is input into the rear wheel 48 due to turning of the vehicle, etc., the rear subframe 21 is swingingly displaced about the imaginary line L0 as an axis.

In this case, as indicated by the one-dot chain lines on FIG. 14, the lower-arm support section 29 is swingingly displaced inwardly in the vehicle width direction while drawing an arc, about an intersection point P1 between the imaginary line L0 (line passing through both the front fixing section 25 and the rear fixing section 26), and a imaginary line L5 extending in the front-rear direction and passing through the lower-arm support section 29. On the other hand, as indicated by the one-dot chain lines on FIG. 14, the rear-lower-arm support section 38 is swingingly displaced inwardly in the vehicle width direction while drawing an arc, about an intersection point P2 between the imaginary line L0 and a imaginary line L6 extending in the vehicle width direction and passing through the rear-lower-arm support section 38.

Next, the case where the front fixing section 25 is offset outwardly in the vehicle width direction as indicated by the two-dot chain lines on FIG. 14(a) will be discussed as a comparative example. The offset front fixing section is designated by the reference mark 25'. The offset front fixing section 25' is located at the same position in the vehicle width direction as that of the rear fixing section 26. In this case, as indicated by the two-dot chain lines on FIG. 14, the rear subframe 21 is swingingly displaced about an imaginary line L7 passing through the front and rear fixing sections 25', 26, as an axis, and each of the lower-arm support section 29 and the rear-lower-arm support section 38 is swingingly displaced inwardly in the vehicle width direction while drawing an arc, about a respective one of points P1', P2' each passing through the imaginary line L7.

The above embodiment where the front fixing section 25 is located inward of the rear fixing section 26 in the vehicle width direction will be compared to the comparative example where the front fixing section 25' is located at the same position in the vehicle width direction as that of the rear fixing section 26. In the above embodiment, the front fixing section 25 is located inward of the rear fixing section 26 in the vehicle width direction, and therefore the imaginary line L0 is set to extend obliquely forwardly and inwardly in the vehicle width direction, so that an elevation angle θ1 of the lower-arm support section 29 with respect to the imaginary line L0 (point P1) is greater than an corresponding angle in the comparative example, i.e., an elevation angle θ1' with respect to the imaginary line L7 (point P1'). Thus, when the lower-arm support section 29 is swingingly displaced inwardly in the vehicle width direction by the same angle ω (see FIG. 14(b)), a lateral displacement amount δ1 of the lower-arm support section 29 in the above embodiment becomes greater than a lateral displacement amount δ1' of the lower-arm support section 29 in the comparative example.

Further, in the above embodiment, the imaginary line L0 is set to extend obliquely forwardly and inwardly in the vehicle width direction. Thus, as with the lower-arm support section 29, an elevation angle θ2 of the rear-lower-arm support section 38 with respect to the imaginary line L0 (point P2) is greater than an corresponding angle in the comparative example, i.e., an elevation angle θ2' with respect to the imaginary line L7 (point P2'). Thus, when the rear-lower-arm support section 38 is swingingly displaced inwardly in the vehicle width direction by the same angle ω, a lateral displacement amount δ2 of the rear-lower-arm support section 38 in the above embodiment becomes greater than a lateral displacement amount δ2' of the rear-lower-arm support section 38 in the comparative example.

However, in the above embodiment, the imaginary line L0 is set to extend obliquely forwardly and inwardly in the vehicle width direction, and the rear-lower-arm support section 38 is located at a position spaced apart inwardly in the vehicle width direction from the imaginary line L0, i.e., disposed inward of the lower-arm support section 29 in the vehicle width direction, so that the elevation angle θ2 becomes significantly smaller than the elevation angle θ1. Thus, a rate of increase of the elevation angle θ2 with respect to the elevation angle θ2' is less than a rate of increase of the elevation angle θ1 with respect to the elevation angle θ1', so that a rate of increase of the lateral displacement amount δ2 with respect to the lateral displacement amount δ2' is less than a rate of increase of the lateral displacement amount δ1 with respect to the lateral displacement amount δ1'.

That is, in the above embodiment, when the rear subframe 21 is swingingly displaced, a difference between the lateral displacement amounts δ1, δ2 is increased, in other words, it is possible to more largely pull the lower-arm support section 29 inwardly in the vehicle width direction, with respect to the rear-lower-arm support section 38

Further, under the same condition in terms of an elevation angle, a swing radius becomes larger along with an increase in distance from the swing axis to the lower-arm support section 29 or the rear-lower-arm support section 38, and therefore the lateral displacement amount is increased accordingly. In the above embodiment, although the imaginary line L0 serving as the swing axis is inclined inwardly in the vehicle width direction, a difference between the lateral displacement amounts δ1, δ2 is increased by setting the lower-arm support section 29 and the rear-lower-arm support section 38 at respective positions spaced apart downwardly with respect to the points P1, P2 on the imaginary line L0 to thereby increase the swing radius.

Further, in the above embodiment, the front fixing section 25 is located at the same height position as that of the rear fixing section 26, so that it becomes possible to increase a distance in the up-down direction from the imaginary line L0 to the lower-arm support section 29, as compared to the case where the front fixing section 25 is disposed at a height position lower than the rear fixing section 26, to thereby further increase the difference between the lateral displacement amounts δ1, δ2.

Further, the rear-lower-arm support section 38 is located above the lower-arm support section 29, and therefore the distance in the up-down direction from the imaginary line L0 to the lower-arm support section 29 is greater than a distance in the up-down direction from the imaginary line L0 to the rear-lower-arm support section 38. This makes it possible to further increase the difference between the lateral displacement amounts δ1, δ2.

As above, in the above embodiment, the difference between the lateral displacement amounts δ1, δ2 can be increased by utilizing the following behavior of the rear subframe 21 which would otherwise be undesirable: when a load (lateral force) is input in a vehicle-widthwise inward direction into the rear subframe 21 during turning of the vehicle, etc., the rear subframe 21 is swingingly displaced about the imaginary line L0 (line passing through both of the front and rear fixing sections 25, 26). This makes it possible to more largely pull the lower-arm support section 29 inwardly in the vehicle width direction, with respect to the rear-lower-arm support section 38, and promote a change in suspension geometry toward a toe-in, more effectively than ever before.

Figure 15:
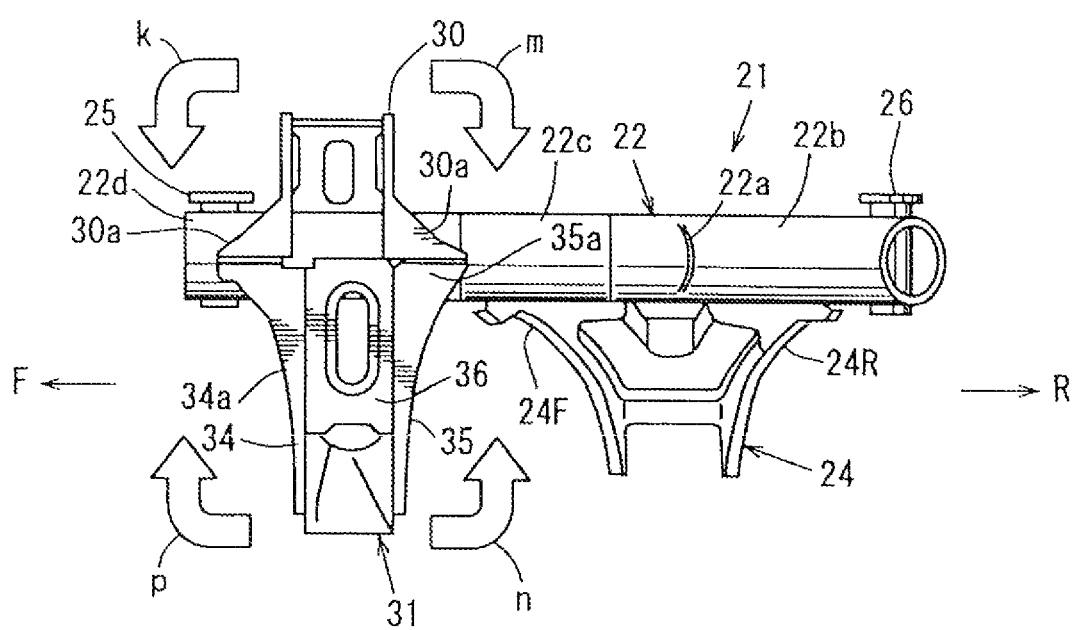
FIG. 15 is an explanatory diagram of an operation during input of a force in a front-rear direction.

Next, with reference to the side view in FIG. 15, an operation in a situation where a load is input in the front-rear direction from the front upper arm 32 and the front lower arm 33, respectively, into the bracket 30 and the bracket 31 will be described.

In a first situation where a forward load is input into the bracket 30 and the bracket 31, a forward and downward moment k is applied to the bracket 30, and a forward and upward moment p is applied to the bracket 30.

In the above embodiment, the bracket 30 and the bracket 31 are provided in spaced-apart (adjacent) relation in the up-down direction, and each of the bracket 30 and the bracket 31 is widely joined to the side member segment 22 through a respective one of the forwardly-extending flange portions 30a, 34a, so that the forward and downward moment k applied to the bracket 30 and the forward and upward moment p applied to the bracket 31 interact each other in mutually cancelling-out directions. Thus, the moments k, p are mutually cancelled out.

In a second situation where a rearward load is input into the bracket 30 and the bracket 31, a rearward and downward moment m is applied to the bracket 30, and a rearward and upward moment n is applied to the bracket 30.

In the above embodiment, the bracket 30 and the bracket 31 are provided in spaced-apart (adjacent) relation in the up-down direction, and each of the bracket 30 and the bracket 31 is widely joined to the side member segment 22 through a respective one of the rearwardly-extending flange portions 30a, 35a, so that, as in the first situation where a forward load is input, the rearward and downward moment m applied to the bracket 30 and the rearward and upward moment n applied to the bracket 31 interact each other in mutually cancelling-out directions. Thus, the moments m, n are mutually cancelled out.

Further, in the above embodiment, the front fixing section 25, and the set of the flange portions 30a, 34a of the brackets 30, 31, are arranged in such a manner that positions thereof in the front-rear direction overlap each other, so that the load (moments k, p, m, n) input in the front-rear direction is transmitted to the No. 4 cross member as a vehicle-body component, via the front fixing section 25.

Figure 16:
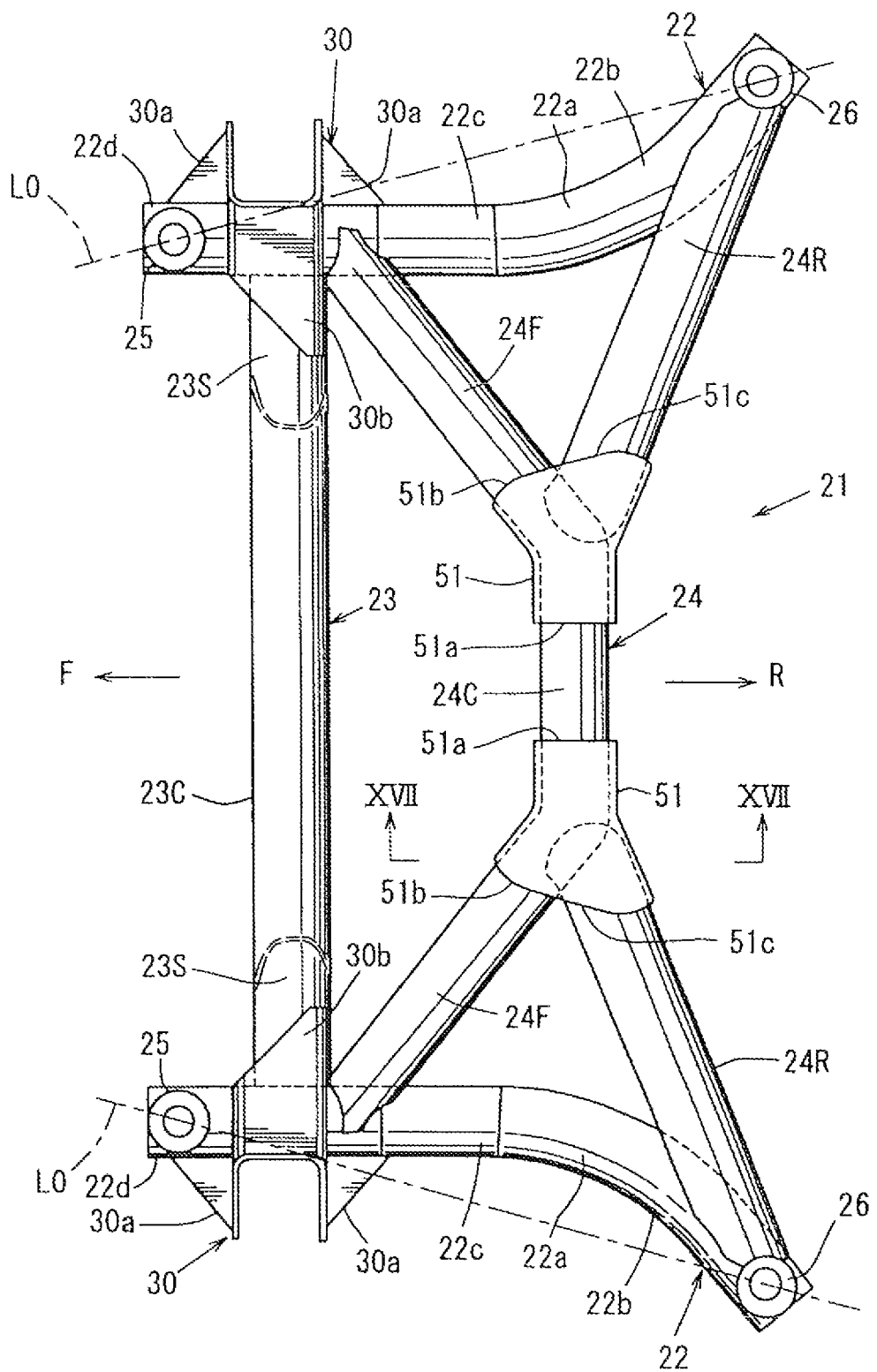
FIG. 16 is a top plan view illustrating a rear subframe mounting structure according to a second embodiment of the present invention.
Figure 17:
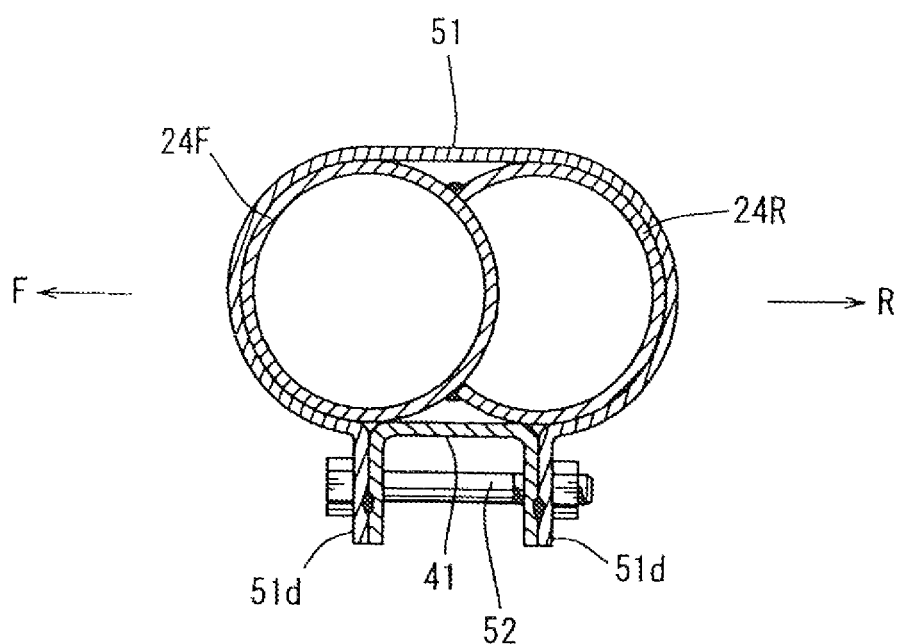
FIG. 17 is a sectional view taken along the arrowed line XVII-XVII in FIG. 16.

FIGS. 16 and 17 illustrate a rear subframe mounting structure according to a second embodiment of the present invention, wherein FIG. 16 is a top plan view of a rear subframe, and FIG. 17 is a sectional view taken along the arrowed line XVII-XVII in FIG. 16.

In the second embodiment, in addition to a side member segment 22 and a front cross member segment 23, a rear cross member segment 24 is also formed into a pipe-like shape.

That is, the rear cross member segment 24 comprises: a central portion 24C; a front branch portion 24F extending obliquely forwardly and outwardly in the vehicle width direction from each of opposite right and left ends of the central portion 24C; and a rear branch portion 24R extending obliquely rearwardly and outwardly in the vehicle width direction from each of the right and left ends of the central portion 24C while being branched with respect to the front branch portion 24F. Among them, the central portion 24C and the front branch portion 24F are integrally formed together using the same pipe member, and a vehicle-widthwise outer end of the front branch portion 24F is joined to the side member segment 22 by means of continuous welding. On the other hand, the rear branch portion 24R is formed using a pipe member different from that for the central portion 24C and the front branch portion 24F. A vehicle-widthwise inner end of the rear branch portion 24R is joined to a vicinity of a boundary region between the front branch portion 24F and the central portion 24C (in the embodiment illustrated in FIG. 16, a vehicle-widthwise inner end of the front branch portion 24F) by means of continuous welding, and a vehicle-widthwise outer end of the rear branch portion 24R is joined to the rear end region of the side member segment 22 by means of continuous welding.

A cross-sectionally approximately C-shaped bracket 51 is provided on a region where the central portion 24C, the front branch portion 24F and the rear branch portion 24R are joined together to form a Y shape in top plan view, in such a manner as to cover the region from thereoutside. An edge 51a of a vehicle-widthwise inner end of the bracket 51 is joined to the central portion 24C by means of continuous welding, and a front edge 51b of a vehicle-widthwise outer end of the bracket 51 is joined to the front branch portion 24F by means of continuous welding, and a rear edge 51c of a vehicle-widthwise outer end of the bracket 51 is joined to the rear branch portion 24R by means of continuous welding.

As illustrated in FIG. 17, a pair of front and rear downward-extending rear-lower-arm support pieces 51d are integrally provided with a lower portion of the bracket 51. A cross-sectionally angular C-shaped stiffener 41 is provided between the pair of front and rear rear-lower-arm support pieces 51d, and two attaching pieces of the stiffener 41 (two downwardly-protruding pieces provided at respective front and rear edges of the stiffener 41) are joined, respectively, to the rear-lower-arm support pieces 51d by means of welding. A rear-lower-arm support pin 52 is disposed to lie horizontally between the pair of front and rear rear-lower-arm support pieces 51d, and a vehicle-widthwise inner end of the rear lower arm 37 illustrated in FIG. 1 is pivotally supported by the rear-lower-arm support pin 52.

As above, in the embodiment illustrated in FIGS. 16 and 17, all of the central portion 24C, the front branch portion 24F and the rear branch portion 24R in the rear cross member segment 24 are formed into a pipe-like shape.

According to this configuration, it becomes possible to further promote weight reduction and rigidity enhancement in the rear subframe 21, and further promote the distribution of a rear impact load via the rear subframe 21.

In the embodiment illustrated in FIGS. 16 and 17, the remaining configuration, functions and effects are approximately the same as those in the first embodiment. Thus, in FIGS. 16 and 17, the same element or component as that in the aforementioned figures is assigned with the same reference mark, and its detailed description will be omitted.

Figure 18:
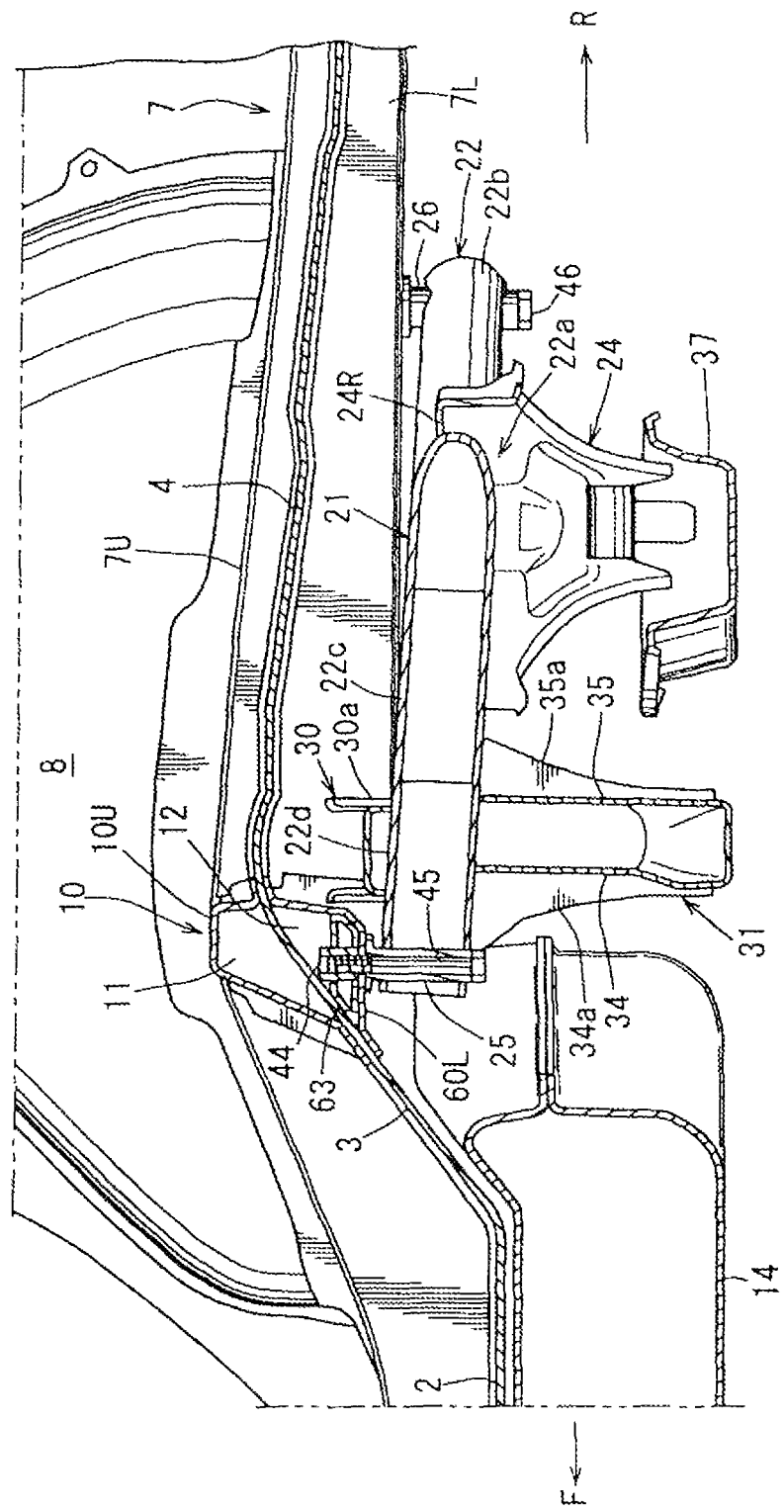
FIG. 18 is a side sectional view illustrating a rear subframe mounting structure according to a third embodiment of the present invention.

FIG. 18 is a side sectional view illustrating a rear subframe mounting structure according to a third embodiment of the present invention.

In the third embodiment, an up-down directional (height) position of a front fixing section 25 is set to become higher than that in the aforementioned embodiments. Thus, the front fixing section 25 is located at a higher position than a rear fixing section 26.

Specifically, a lower surface of a cross member lower panel 60L of a No. 4 cross member 10 to which the front fixing section 25 is to be mounted is set at a position higher than the cross member lower panel 10L in the aforementioned embodiments. As a result of setting the lower surface of the cross member lower panel 60L (No. 4 cross member 10) at a higher position, a position of the front fixing section 25 is heightened accordingly. The member designated by the mark 63 in the figure is a reinforcement corresponding to the reinforcement 43 in the aforementioned embodiments.

According to this configuration, the front fixing section 25 is located at a higher position than the rear fixing section 26, so that it becomes possible to more largely ensure a distance in the up-down direction from an imaginary position L0 to a lower-arm support section 29, and further increase a difference between lateral displacement amounts δ1, δ2.

In addition, there is an advantageous effect of being able to more reliably suppress a change in camber angle of a rear wheel 48 toward a positive camber.

In the embodiment illustrated in FIG. 18, the remaining configuration, functions and effects are approximately the same as those in the aforementioned embodiments. Thus, in FIG. 18, the same element or component as that in the aforementioned figures is assigned with the same reference mark, and its detailed description will be omitted.

Figure 19:
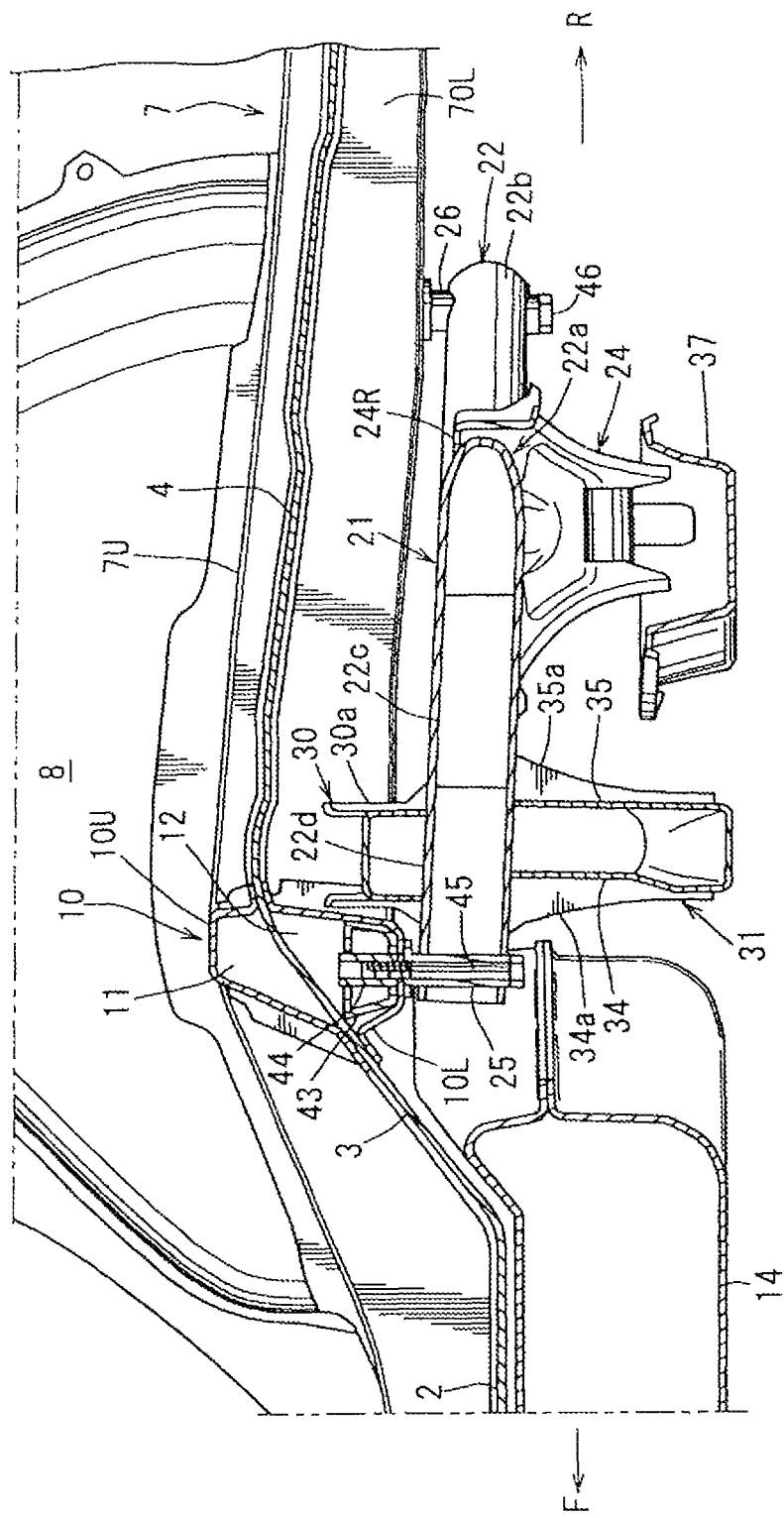
FIG. 19 is a side sectional view illustrating a rear subframe mounting structure according to a fourth embodiment of the present invention.

FIG. 19 is a side sectional view illustrating a rear subframe mounting structure according to a fourth embodiment of the present invention.

In the fourth embodiment, an up-down directional (height) position of a rear fixing section 26 is set to become lower than that in the aforementioned embodiments. Thus, the front fixing section 25 is located at a higher position than the rear fixing section 26.

Specifically, a lower surface of a rear side frame lower panel 70L of a rear side frame 7 is inclined in such a manner that a height position thereof becomes gradually lower toward a rearward direction. Thus, a lower surface of a rear portion of the rear side frame lower panel 70L, i.e., a mountable portion of the rear fixing section 26 is set at a position lower than the rear side frame lower panel 7L in the aforementioned embodiments. As a result of setting the lower surface of the rear portion of the rear side frame lower panel 70L (rear side frame 7) at a lower position, a position of the rear fixing section 26 is lowered accordingly.

According to this configuration, the rear fixing section 26 is located at a lower position than the front fixing section 25 (in other words, the front fixing section 25 is located at a higher position than the rear fixing section 26), and thereby a distance in the up-down direction from an imaginary position L0 to a rear-lower-arm support section 38 is reduced. Thus, a distance in the up-down direction from the imaginary position L0 to a lower-arm support section 29 is relatively increased, so that it becomes possible to further increase a difference between lateral displacement amounts δ1, δ2.

In addition, there is an advantageous effect of being able to more reliably suppress a change in camber angle of a rear wheel 48 toward a positive camber.

However, in the case where the lower surface of the rear portion of the rear side frame 7 (the rear side frame lower panel 70L) is set to extend obliquely downwardly and rearwardly, as in the fourth embodiment, when a load is input forwardly from the side of a rear end of a vehicle during a vehicle rear collision, etc., the rear side frame 7 is likely to be bendingly deformed by using, as a trigger point, a bent portion formed in a boundary between the inclined region and a region (approximately horizontal region) located forward of the inclined region. For this reason, in the case where the front fixing section 25 is located at a higher position than the rear fixing section 26, it is generally preferable that the position of the front fixing section 25 is heightened as in the third embodiment illustrated in FIG. 18.

It is to be understood that a technique of lowing the position of the rear fixing section 26 is not necessarily limited to inclining the lower surface of the rear portion of the rear side frame 7 (the rear side frame lower panel 70L), as in the fourth embodiment. For example, the rear fixing section 26 may be mounted to a lower surface of a rear portion of a rear side frame 7 extending approximately horizontally, through a bracket (spacer). In this case, it is possible to eliminate the above risk that the rear side frame 7 is more likely to be bendingly deformed.

In the embodiment illustrated in FIG. 19, the remaining configuration, functions and effects are approximately the same as those in the aforementioned embodiments. Thus, in FIG. 19, the same element or component as that in the aforementioned figures is assigned with the same reference mark, and its detailed description will be omitted.

Figure 20:
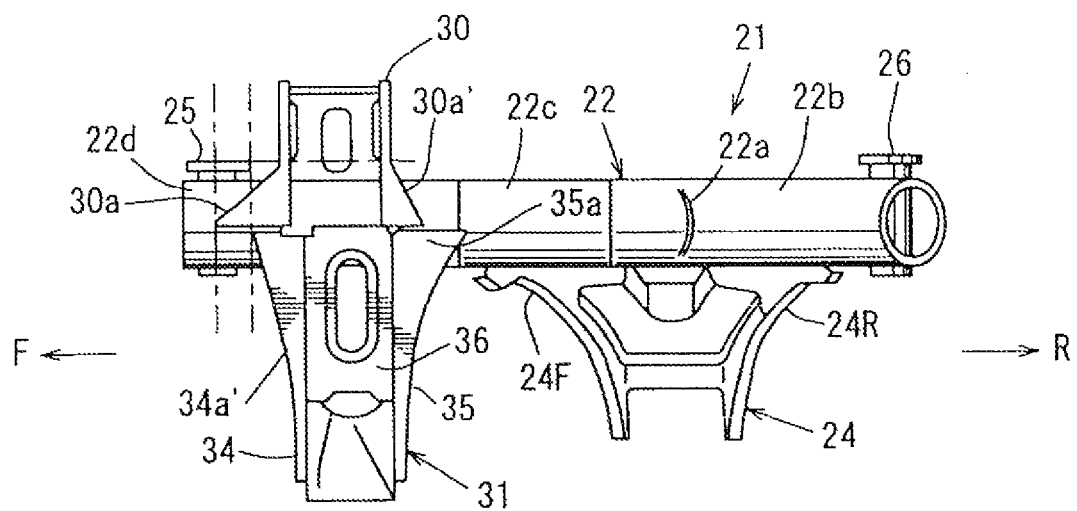
FIG. 20 is a side sectional view illustrating a rear subframe mounting structure according to a fifth embodiment of the present invention.

FIG. 20 is a side sectional view illustrating a rear subframe mounting structure according to a fifth embodiment of the present invention.

In the fifth embodiment, a pair of upper-side and lower-side brackets 30, 31 are provided on a front portion of a side member segment 22, as with the aforementioned embodiments. The lower-side bracket 31 is disposed at approximately the same position in the front-rear direction as that of a front cross member segment 23, and a front flange portion 34a' of the bracket 31 is disposed at a position where it does not overlap a front fixing section 25 (in such a manner that positions thereof in the front-rear direction do not overlap each other), in side view. The upper-side bracket 30 is offset forwardly with respect to the lower-side bracket 31, as a whole, and a front flange portion 30 of the upper-side bracket 30 is disposed at a position where it overlaps the front fixing section 25 (in such a manner that positions thereof in the front-rear direction overlap each other), in side view. A rear edge of a rear flange portion 30a' of the bracket 30 is located forward of a rear edge of a rear flange portion 35a of the bracket 31.

According to this configuration, the bracket 31 and the front cross member segment 23 are arranged at approximately the same position in the front-rear direction, so that it becomes possible to enhance rigidity by the front cross member segment 23 without an increase in size of the flange portions 34a', 35a of the bracket 31. In addition, the flange portion 34a' is set to a small size enough to avoid overlapping with the front fixing section 25, in side view, so that it becomes possible to further promote the weight reduction.

In the fifth embodiment, the lower-side bracket 31 supporting a front lower arm 33 is disposed at approximately the same position in the front-rear direction as that of the front cross member segment 23, and the upper-side bracket 30 is disposed to be offset forwardly with respect to the lower-side bracket 31. Alternatively, in an opposite manner, the upper-side bracket 30 may be disposed on a rearward side (at approximately the same position in the front-rear direction as that of the front cross member segment 23), and the lower-side bracket 31 may be disposed to be offset forwardly.

In the embodiment illustrated in FIG. 20, the remaining configuration, functions and effects are approximately the same as those in the aforementioned embodiments. Thus, in FIG. 20, the same element or component as that in the aforementioned figures is assigned with the same reference mark, and its detailed description will be omitted.

Last of all, distinctive features disclosed in the above embodiments and functions and advantageous effects based on the features will be outlined.

A technique disclosed in the above embodiments relates to a mounting structure for mounting to a vehicle body a rear subframe supporting an arm of a rear suspension. The rear subframe comprises: a pair of right and left side member segments; a front cross member segment coupling the side member segments together; and a rear cross member segment coupling the side member segments together, at a position spaced apart rearwardly from the front cross member segment. The rear cross member segment has a central portion extending in a vehicle width direction between the side member segments, and a front branch portion and a rear branch portion branched forwardly and rearwardly from each of vehicle-widthwise outer ends of the central portion, while extending in the vehicle width direction. Each of the side member segments has a bent portion with its axis extending in a curved manner between a coupling portion between the front branch portion and the side member segment, and a coupling portion between the rear branch portion and the side member segment. The bent portion has a wall thickness set to be less than that of a region of the side member segment located forward of the bent portion.

This mounting structure has the following advantageous effects.

The branch portions (the front branch portion, the rear branch portion) formed by branching each lateral portion of the rear cross member segment in a two-forked shape are coupled, respectively, to two front and rear portions of the side member segment, and a portion of the side member segment between the front and rear coupling portions is formed as the bent portion having a relatively thin wall thickness, so that it becomes possible to allow a vicinity of a coupled region between the rear cross member segment and the side member segment which has not heretofore been positively utilized as a shock absorbing member during a rear collision, to easily undergo deformation by using the bent portion as a trigger point, while downsizing the entire rear subframe including the side member segment in the front-rear direction. Based on this deformation, a rear impact load is effectively absorbed, so that vehicle safety during a rear collision can be enhanced.

In addition, a truss structure is formed by the front branch portion, the rear branch portion and the side member segment, so that it becomes possible to, in a normal state, sufficiently ensure rigidity of the rear subframe, and enhance rigidity for supporting the arm of the rear suspension, without providing any special reinforcing member.

In essence, it becomes possible to enhance the rigidity for supporting the arm of the rear suspension while achieving downsizing, weight reduction and rigidity enhancement of the rear subframe, and, during a vehicle rear collision, sufficiently absorb a rear impact load by means of deformation of the relatively easily deformable rear subframe.

Preferably, in the above mounting structure, a fuel tank is disposed forward of the front cross member segment of the rear subframe.

According to this feature, it becomes possible to prevent interference between the rear subframe and the fuel tank during a vehicle rear collision. That is, in the above mounting structure, during a vehicle rear collision, the vicinity of the coupled region between the rear cross member segment and the side member segment is positively deformed, and accordingly a rear impact load is sufficiently absorbed, so that it becomes possible to suppress forward displacement of the rear subframe, as mentioned above. Therefore, it becomes possible to avoid interference of the front cross member segment of the rear subframe with the fuel tank.

Further, as mentioned above, the entire rear subframe is reduced in size in the front-rear direction, so that a layout area of the fuel tank can be expanded toward the rear subframe (rearwardly).

Preferably, in the above mounting structure, each of the side member segments has a front end provided with a front fixing section mounted to a first vehicle-body component, and a rear end provided with a rear fixing section mounted to a second vehicle-body component, wherein a region of the side member segment between the rear fixing section and the bent portion extends obliquely along a rearward extending direction of the bent portion.

The term "first vehicle-body component" or "second vehicle-body component" means a strength member composed of a part art of a skeleton of the vehicle body. They may be different members or may be the same member.

According to this feature, a load input from the rear fixing section is transmitted forwardly in a smooth manner, so that it becomes possible to suppress the occurrence of stress concentration between the rear fixing section and the bent portion. Thus, even if the wall thickness is reduced, strength necessary in a normal state can be ensured, so that it becomes possible to further promote weight reduction and rigidity enhancement of the rear subframe.

More preferably, in the mounting structure, each of the side member segments has an intermediate portion in a front-rear direction to which the front branch portion of the rear cross member segment is coupled, wherein the intermediate portion has a wall thickness greater than that of the bent portion.

According to this feature, the side member segment and the rear cross member segment are coupled together with high rigidity, so that it becomes possible to, during a vehicle rear collision, reliably transmit and distribute a rear impact load input from the rear fixing section into the side member segment, toward the vehicle body via the entire rear subframe, and suppress forward displacement of the side member segment. In addition, it becomes possible to suppress vibration of the side member segment during a normal state, and noise due to the vibration.

Further, the wall thickness is changed in the vicinity of a boundary region between the intermediate portion and the bent portion located rearward of the intermediate portion, in the side member segment, so that it becomes possible to, during a vehicle rear collision, allow the bent portion to positively undergo deformation by using the boundary region as a trigger point.

More preferably, in the above mounting structure, an intersecting angle defined in a rear side of the coupling portion between the side member segment and the rear branch portion of the rear cross member segment is set to an obtuse angle.

According to this configuration, during a vehicle rear collision, a load input from the rear fixing section into the rear portion of the side member segment can be smoothly transmitted to the rear cross member segment without largely changing a pathway, so that it becomes possible to further enhance load transmissibility in the vehicle width direction.

Preferably, in the mounting structure, the rear cross member segment has the central portion provided with an arm support section by which the arm of the rear suspension is pivotally supported.

According to this feature, a load input from the arm of the rear suspension can be distributed frontwardly and rearwardly via the branch portions (the front branch portion, the rear branch portion) of the rear cross member segment, so that it becomes possible to further enhance the rigidity for supporting the arm.

In addition, the position of the arm support section is set on a vehicle-widthwise inner side, and thereby the arm has a relatively long arm length, so that it becomes possible to suppress a change in toe angle, etc., during an up-down movement of a wheel.

The invention claimed is:

1. A mounting structure for mounting to a vehicle body a rear subframe supporting an arm of a rear suspension, wherein:

the rear subframe comprises: a pair of right and left side member segments; a front cross member segment coupling the side member segments together; and a rear cross member segment coupling the side member segments together, at a position spaced apart rearwardly from the front cross member segment;

the rear cross member segment has a central portion extending in a vehicle width direction between the side member segments, and a front branch portion and a rear branch portion branched forwardly and rearwardly from each of vehicle-widthwise outer ends of the central portion, while extending in the vehicle width direction;

each of the side member segments has a front end provided with a front fixing section mounted to a first vehicle-body component, and a rear end provided with a rear fixing section mounted to a second vehicle-body component;

each of the side member segment has: a front portion and an intermediate portion each extending rearwardly and linearly from the front fixing section; a rear portion extending obliquely rearwardly and outwardly in a vehicle width direction to the rear fixing section; and a bent portion provided to connect the intermediate portion and the rear portion together, and having an axis extending in a curved manner;

each of vehicle-widthwise outer ends of the front cross member segment is coupled to a respective one of the front portions of the side member segments;

vehicle-widthwise outer ends of the set of the front branch portion and the rear branch portion of the rear cross member segment are coupled, respectively, to the intermediate portion and the rear portion of a corresponding one of the side member segments;

a rear-side intersecting angle defined between the rear branch portion of the rear cross member segment and the rear portion of the corresponding side member segment is set to an obtuse angle; and each of the side member segments is formed in such a manner that the intermediate portion has a wall thickness less than that of the front portion, and each of the bent portion and the rear portion has a wall thickness less than that of the intermediate portion.

2. The mounting structure as defined in claim 1, wherein a fuel tank is disposed forward of the front cross member segment of the rear subframe.

3. The mounting structure as defined in claim 1, wherein the rear cross member segment has the central portion provided with a rear-lower-arm support section by which a rear lower arm of the rear suspension is pivotally supported.

4. The mounting structure as defined in claim 3, wherein the rear subframe comprises an upper-arm support bracket which is attached to each of the front portions of the side member segments, and by which a front upper arm of the rear suspension is pivotally supported.

5. The mounting structure as defined in claim 4, wherein the rear subframe comprises a lower-arm support bracket which is attached to each of the front portions of the side member segments at a position located below the upper-arm support bracket, and by which a front lower arm of the rear suspension is pivotally supported.

* * * * *